(12) United States Patent
Thibodeau et al.

(10) Patent No.: US 7,902,706 B2
(45) Date of Patent: Mar. 8, 2011

(54) ROTATIONAL APPARATUS INCLUDING A PASSIVE MAGNETIC BEARING

(75) Inventors: Robert J. Thibodeau, Gloucester, MA (US); Christopher Williams, Manchester, MA (US); Daniel Irvin, Prides Crossing, MA (US)

(73) Assignee: Maglev Technologies, LLC, Gloucester, MA (US)

( * ) Notice: Subject to any disclaimer, the term of this patent is extended or adjusted under 35 U.S.C. 154(b) by 455 days.

(21) Appl. No.: 11/894,400

(22) Filed: Aug. 20, 2007

(65) Prior Publication Data
US 2008/0042504 A1   Feb. 21, 2008

Related U.S. Application Data

(60) Provisional application No. 60/838,689, filed on Aug. 18, 2006.

(51) Int. Cl.
*H02K 7/09* (2006.01)
(52) U.S. Cl. ..................................................... 310/90.5
(58) Field of Classification Search .................. 310/90.5
See application file for complete search history.

(56) References Cited

U.S. PATENT DOCUMENTS

| 4,553,075 | A | * | 11/1985 | Brown et al. ............ 318/400.01 |
| 6,111,332 | A | * | 8/2000 | Post .............................. 310/90.5 |
| 6,359,357 | B1 | * | 3/2002 | Blumenstock ............... 310/90.5 |
| 2003/0042812 | A1 | | 3/2003 | Post |
| 2003/0042816 | A1 | | 3/2003 | Post |

FOREIGN PATENT DOCUMENTS

| AT | 383874 | 9/1987 |
| DE | 2133209 | 1/1973 |
| DE | 3638129 | 5/1988 |
| FR | 1.317.962 | 5/1963 |
| JP | 56-63117 | 5/1981 |

OTHER PUBLICATIONS

Invitation to Pay Additional Fees for Application No. PCT/US2007/018436, dated Aug. 22, 2008.

* cited by examiner

*Primary Examiner* — Nguyen N Hanh
(74) *Attorney, Agent, or Firm* — Nelson Mullins Riley & Scarborough LLP; Pankaj N. Desai

(57) ABSTRACT

A rotational apparatus with one or more passive magnetic bearing(s) is described. The rotational apparatus includes a rotor with a tapered magnetic ring and a stator with a tapered array of shorted conducting circuits. A repulsive force between the tapered magnetic ring and the tapered array of shorted conducting circuits acts a passive magnetic bearing that centers the rotor radially in a stator cavity and that repels the rotor axially away from an end of the stator cavity.

26 Claims, 22 Drawing Sheets

ROTATIONAL APPARATUS INCLUDING A PASSIVE MAGNETIC BEARING

RELATED APPLICATIONS

This application claims priority to Provisional Application Ser. No. 60/838,689, filed Aug. 18, 2006, and entitled Improved Generator, the entire contents of which are incorporated herein by reference.

BACKGROUND OF THE INVENTION

The present invention relates to a rotational apparatus including one or more passive magnetic bearing(s) that exert radially centering forces on a rotatable element as well as axial force on the rotatable element while the rotor rotatable element is rotating. In an embodiment of the invention, the passive magnetic bearing(s) are formed of a tapered magnetic ring in a rotor and a tapered array of shorted conducting circuits in a stator where the stator also includes non-shorted conducting circuits for current generation and/or for exerting torque on the rotor.

One conventional technique to drive a rotatatable element, such as a rotor or an impeller, of a rotational apparatus is through the use of an impeller drive shaft. The impeller drive shaft often penetrates a housing and the driven fluid to connect to a center hub of the impeller. Such a configuration causes the impeller drive shaft to travel through the pump housing and the driven fluid, thus, requiring features such as fluid seals or shaft housings to seal the shaft as it penetrates the housing to prevent the driven fluid from exiting the housing through the point of shaft entry.

Recent improvements in rotational apparatus technology have eliminated the need for the drive shaft to drive an impeller of a rotational apparatus and therefore, have eliminated the need for drive shaft seals and drive shaft housings. One improvement incorporates magnets or electromagnets in an impeller drive assembly in place of a drive shaft. However, a magnetic or an electromagnetic drive assembly alone still requires a mechanical bearing affixed to a spindle or shaft on which the impeller is mounted. One drawback to this arrangement is that the mechanical bearing tends to wear over time requiring maintenance, downtime, and at some point replacement. Further, mechanical bearings still require one or more seals to prevent contamination of the bearing, the driven fluid, or both. Unfortunately, the mechanical seals tend to leak over time requiring maintenance and replacement.

Other recent improvements in rotational apparatus technology include an active magnetic bearing assembly, separate from the magnetic drive assembly, in place of the mechanical bearing. For an active magnetic bearing assembly, placement of the magnetic bearing assembly in relation to the magnetic drive assembly is critical in order to avoid magnetic interference between the active magnetic bearing assembly and the magnetic drive assembly because each magnetic assembly generates a unique and exclusive magnetic field. Avoiding magnetic interference puts extensive constraints on relative locations and geometries of the magnetic drive assembly and the magnetic bearing assembly. Further, a separate active magnetic bearing assembly and a separate magnetic drive assembly often require complex control systems to compensate for changes in magnetic field strength during operation of the rotational apparatus such as at start up, shutdown, acceleration, or deceleration. In the case of sudden loss of power, an active magnetic bearing assembly ceases to operate which can lead to sudden catastrophic failure of the rotational apparatus.

In contrast, in the event of sudden power loss power loss, passive magnetic bearings continue to function until the rotational speed of a rotatable element falls below a critical value, which greatly reduces the risk of sudden and catastrophic failure of the rotational apparatus. Additionally, a passive magnetic bearing assembly may produce less interference with an active magnetic drive assembly. However, passive magnetic bearings may greatly increase the complexity of a rotational apparatus by requiring a rotatable element to have separate magnetic arrays for a drive assembly, a first magnetic bearing assembly for radial centering, and a second magnetic bearing assembly to prevent contact between the rotatable element and a stationary element in an axial direction.

Thus, there exists a need for a rotational apparatus that incorporates one or more passive magnetic bearing(s) that radially center a rotatable element, such as a rotor, and that prevent contact between the rotatable element and a stationary element along an axis of rotation. A magnetic array used for the passive magnetic bearing should also be used to generate power and/or generate torque on the rotatable element.

SUMMARY OF THE INVENTION

Illustrative embodiments of the present invention relate to a rotational apparatus having one or more magnetic bearings that exert both radial forces that act to center a rotor body and axial forces directed along a central stator axis that prevent the rotor body from contacting the stator. An exemplary rotational apparatus includes a stator assembly and a rotor assembly located in a cavity of the stator assembly. The rotor assembly includes a rotor body that has a first body end and a central body axis passing through the center of first body end. The rotor body also has a first tapered portion with a first tapered body surface extending along the central body axis and tapering toward the first body end. The rotor assembly also includes a tapered magnetic ring at the first tapered portion of the rotor body. The tapered magnetic ring includes a plurality of magnetic arrays. A magnetic field produced by the plurality of magnetic arrays has a substantial component directed tangentially with respect to the central body axis and with respect to the first tapered body surface. The magnetic field also has a substantial component directed along a normal to the first tapered body surface.

The stator assembly includes a stator body that has a cavity with a first cavity end and a central cavity axis passing through the center of the first cavity end. The stator assembly also includes a tapered array of shorted conducting circuits supported by the stator body. An inner profile of the tapered array defines a tapered shape that extends toward the first cavity end. The tapered shape of the inner profile of the tapered array is complementary to the first tapered surface of the rotor body.

According to aspects of the present invention, rotation of the tapered magnetic ring about the central body axis may induce current in the tapered array of shorted circuits causing a magnetic force on the tapered magnetic ring directed away from the tapered array of shorted conducting circuits, according to the teachings of the present invention. The magnetic force on the tapered magnetic ring may have both an inward radial component with respect to the central cavity axis and an axial component relative to the central cavity axis. The magnetic force may act to center the rotor assembly with respect to the central cavity axis.

According to further aspects of the present invention, the plurality of magnetic arrays in the tapered magnetic ring may include a plurality of magnetic Halbach arrays with each of the plurality of magnetic Halbach arrays oriented and positioned to minimize a magnitude of a magnetic field directed into the rotor body, according to the teachings of the present invention. Each of the plurality of magnetic Halbach arrays may include five magnetic segments. A first end magnetic segment and a last end segment may be smaller than middle segments of each array of five segments.

According to other aspects of the present invention, the tapered magnetic ring of the rotor assembly may be opposed to the magnetic array of shorted conducing circuits of the stator assembly when the rotor assembly is rotating. The plurality of magnetic arrays of the tapered magnetic ring may form a single continuous repeating magnetic array. The plurality of arrays of the tapered magnetic ring may not form a non-continuous repeating magnetic array.

According to further aspects of the present invention, a plurality of shorted conducting circuits in the tapered array of conducting circuits may be substantially coplanar with the central cavity axis. A shorted conducting circuit in the tapered array of shorted conducting circuits may include an inner conducting segment forming a portion of the inner profile of the tapered array, and an outer conducting segment parallel to the inner conducting segment. The shorted conducting circuit may also include a top conducting segment perpendicular to the inner conducting segment, and a bottom conducting segment perpendicular to the inner conducting segment. The tapered array of shorted conducting circuits may be a tapered array of stamped shorted coils. A plurality of shorted conducting circuits in the tapered array of conducting circuits may be substantially parallel to a first tapered body surface when the rotor assembly is positioned for rotation. The plurality of shorted conducting circuits may include at least one a tapered conducting ring having a plurality of slots formed therethrough.

According to additional aspects of the present invention. The rotor body of the rotational apparatus may have a second body end opposite the first body end with the central body axis passing through the center of the second body end. The rotor body may include a second tapered portion having a second tapered body surface extending along the central body axis and tapering in a direction of the second body end. The tapered magnetic ring may have a second tapered portion with a second tapered surface facing away from the central body axis. The magnetic field produced by the plurality of magnetic arrays measured at the second tapered body surface may have a substantial component directed tangentially with respect to the second tapered body surface and tangentially with respect to the central body axis, and the magnetic field may have a substantial component directed radially with respect to the central body axis. The stator body may have a second cavity end opposite the first cavity end with the central cavity axis passing through the center of the second cavity end. The stator assembly may further include a second tapered array of shorted conducting circuits supported by the stator body. A tapered shape of an inner profile of the second tapered array of shorted conducting circuits may be complementary to the second tapered surface of the rotor body.

Another embodiment of the present invention relates to a rotational apparatus with a rotor body encircling a stator. The stator includes an axle portion with a first axle end, a second axle end and a central stator axis passing through the center of the first axle end and the second axle end. The stator also includes a first flared array of shorted conducting circuits supported by the axle portion. An outer profile of the flared array increases toward the first axle end. The rotor body has a central channel with a first channel end, a second channel end and a central rotor axis passing through a center of the rotor body. The rotor body also has a flared channel surface flaring toward the first channel end. The rotor body includes the rotor body comprising: a magnetic ring disposed at the first channel end and encircling the central channel. The magnetic ring comprises a plurality of magnetic arrays and a magnetic field produced by the plurality of magnetic arrays measured at the flared surface has a substantial component directed tangentially with respect to a central channel axis and with respect to the flared channel surface, and has a substantial component directed along a normal to the flared channel surface.

Another embodiment of the present invention relates to a rotational apparatus having a rotor assembly and a stator assembly with a flared bearing array. The rotor assembly includes a rotor body with a first rotor end, a second rotor end; and a central rotor axis passing through a center of the first rotor end and a center of the second rotor end. The rotor body also includes and a tapered magnetic ring tapering toward a first rotor end, encircling the central rotor axis and disposed at a radial periphery of the rotor body. The stator assembly includes a stator body with a cavity formed therein. The cavity has a first cavity end, a second end; and a central cavity axis passing through a center of the first cavity end and a center of the second cavity end. The stator assembly also includes a tapered stator bearing array supported by the stator, disposed at the first cavity end, and tapering toward the first cavity end. The stator assembly further includes an array of non-shorted conducting circuits supported by the stator body and disposed opposite the tapered magnetic ring. The tapered magnetic ring array and the tapered stator bearing array form a magnetic bearing that exerts a radial magnetic force on the tapered magnetic ring to center the rotor assembly with respect to the central cavity axis. The magnetic bearing exerts an axial magnetic force on the tapered magnetic ring to prevent the tapered rotor assembly from contacting the tapered stator bearing array. The tapered magnetic ring and the array of non-shorted conducting coils convert between rotational energy and electrical energy.

Yet another embodiment of the present invention relates to a rotational apparatus having a flared stator bearing array that is encircled by a rotor assembly. The rotor assembly includes a rotor body with a central channel with a first channel end and a second channel end and a central channel axis passing through a center of the rotor body. The rotor body also has a flared channel surface flaring toward the first channel end and a flared magnetic ring at the first channel end of the rotor body and encircling the central channel, and flared in a direction of the second channel end. The stator includes an axle portion with a first axle end, a second axle end and a central stator axis passing through the center of the first axle end and the second axle end. The stator also includes a flared stator bearing array disposed at the first axle end, where the flared stator bearing array flares toward the first axle end, and an array of non-shorted conducting circuits supported by the stator body and disposed opposite the flared magnetic ring. The flared magnetic ring and the flared stator bearing array form a magnetic bearing that exerts a radial magnetic force on the flared magnetic ring to center the rotor assembly with respect to the central cavity axis, and that exerts an axial force on the flared magnetic ring to prevent the rotor assembly from contacting the flared stator bearing array. The flared magnetic ring and the array of non-shorted conducting coils convert between rotational energy and electrical energy.

BRIEF DESCRIPTION OF THE DRAWINGS

The foregoing and other objects, features and advantages of the invention will be apparent from the following description and apparent from the accompanying drawings in which like reference characters refer to the same parts through-out the different views, wherein.

DETAILED DESCRIPTION

Figure 1:
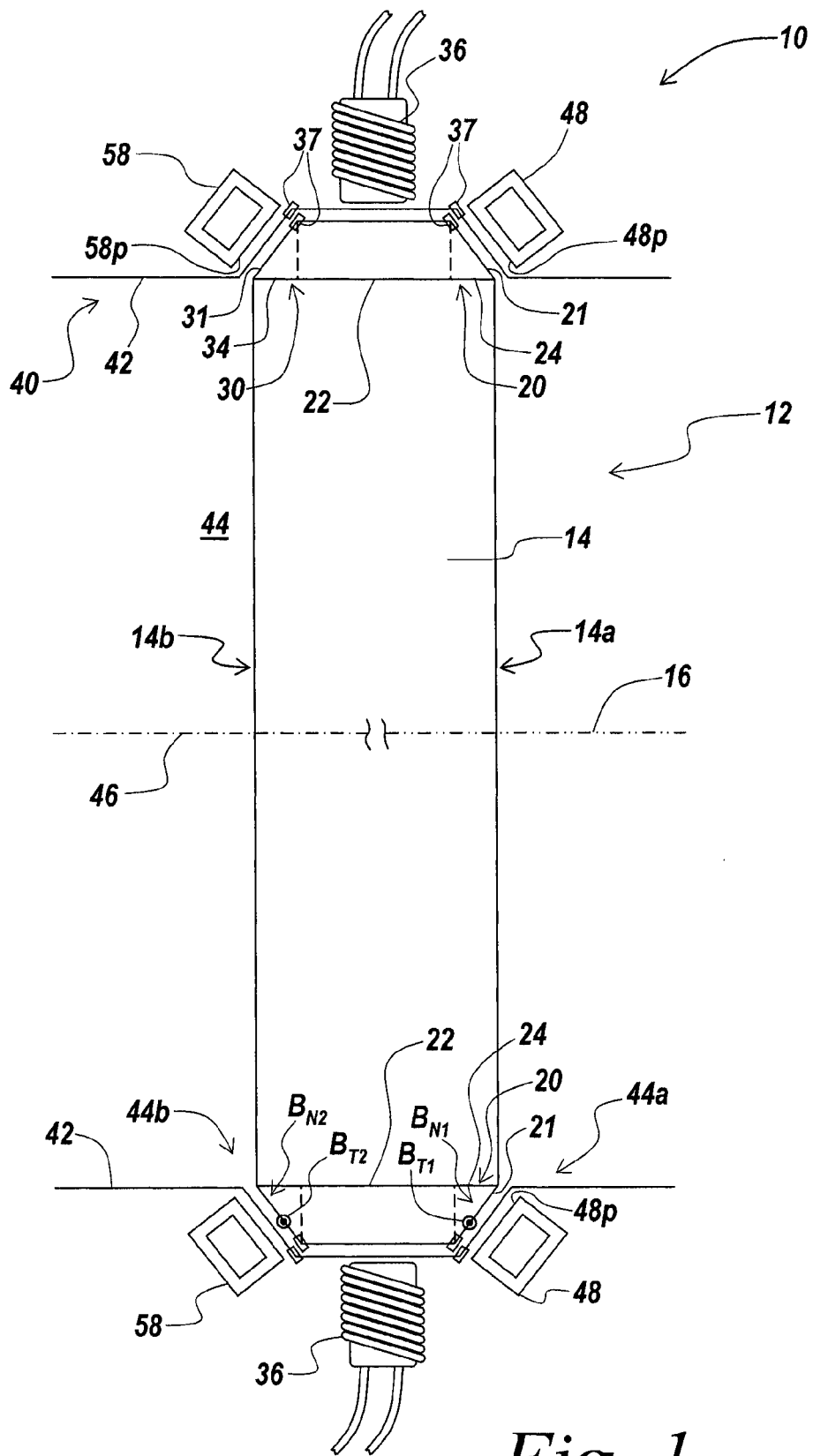
FIG. 1 depicts a side cross-sectional view of an exemplary rotational apparatus according to the teachings of the present invention.

An illustrative embodiment of the present invention relates to a rotational apparatus having one or more magnetic bearings formed of a tapered magnetic ring incorporated in a rotor assembly, and a tapered bearing array incorporated in a stator assembly. The tapered geometry of the tapered magnetic ring and the tapered bearing array, and the orientations of magnetic fields produced by the tapered magnetic ring and the tapered bearing array form allow the magnetic bearing array to exert both radial forces that act to center a rotor body and axial forces directed along a central stator axis that prevent the rotor body from contacting the stator. An exemplary embodiment of the present invention incorporates a passive magnetic bearing formed by a tapered array of shorted conducting circuits in a stator and a tapered magnetic ring in a rotor. The passive magnetic bearing exerts both a centering force in a radial direction and a force an axial direction on the rotor. In another embodiment of the present invention, a rotational apparatus including two such passive magnetic bearings, provides restoring forces to center a rotor both axially and radially within a stator cavity. In some embodiments of the present invention, the tapered magnetic ring may interact with non-shorted conducting circuits to generate electric current and/or to exert torque on a rotor forming an electric generator and/or a motor. By forming a passive magnetic bearing means and current generation/torque generation means out of a tapered array of shorted conducting circuits, non-shorted conducting circuits and a tapered magnetic array, rotor designs may be simplified and made more efficient. Embodiments of the present invention are well suited for use as a fluid movement apparatus, a motor, a generator or another apparatus having a rotatable element.

Before continuing with the discussion below it is helpful to first define a few terms as used herein.

The term "fluid" refers to a substance such as a liquid or a gas tending to flow or conform to the outline of its container or flow channel.

The term "rotor" refers to a mechanical element rotatable about an axis or center.

The term "Halbach array" refers to a group of spatial arrangements of permanent magnets (or electromagnets) which augment the magnetic field on one side of the array while canceling the field to near zero on an opposite side of the array producing a strong, concentrated, spatially periodic magnetic field.

Embodiments of the present invention are directed to a rotational apparatus having a rotor assembly that includes a tapered magnetic ring, the tapered magnetic ring of the rotor assembly provides a magnetic field forming a passive magnetic bearing when the rotor assembly is rotating. In some embodiments, the tapered magnetic array also provides a magnetic field for an electric generator and/or electric motor. In an exemplary embodiment, a tapered magnetic ring in a rotor assembly and a tapered array of shorted conducting circuits form a magnetic bearing that simultaneously provides a centering force on the rotor assembly in a radial direction and an axial repulsive on the rotor assembly that drives the rotor assembly away the tapered array of shorted conducting circuits in an axial direction. Some embodiments of the present invention also include non-shorted conducting circuits that interact the magnetic field of the tapered magnetic ring to form an electric generator and/or motor. Only a limited number of different combinations of the above embodiments are described herein for illustrative purposes and this is not meant to be limiting of the present invention. One of ordinary skill in the art can combine the described embodiments in may other combinations not specifically described herein, which also fall within the scope of the present invention.

FIG. 1 illustrates a side cross-sectional view of an exemplary rotational apparatus 10 according to the teachings of the present invention. Other exemplary rotational apparatuses in accordance with the teachings of the present invention are discussed in more detail below. Additionally, a stator assembly and rotor assembly can have a number of different physical shapes, a number of different configurations, and a number of different magnetic properties that fall within the scope of the present invention as will be discussed below in more detail.

The rotational apparatus 10 includes a rotor assembly 12 and a stator assembly 40. The rotor assembly 12 includes a rotor body 14 with a first body end 14a and a second body end 14b as well as a central body axis 16 passing through the center of the first body end 14a and the second body end 14b. The rotor body 14 includes a first tapered portion 20 having a first tapered body surface 21. The first tapered portion 20 extends along the central body axis 16 and tapers in a direction of the first body end 14a. In use, the rotor assembly 12 rotates about the central body axis 16.

The rotor assembly 12 also includes a tapered magnetic ring 22 located at the first tapered portion 20 of the rotor body 14. The tapered magnetic ring 22 has a plurality of magnetic arrays 24. The plurality of magnetic arrays 24 are arranged and oriented such that a magnetic field produced by the plurality of magnetic arrays 24 measured at the first tapered body surface 21 has a substantial component $B_{T1}$ directed tangentially with respect to the central body axis 16 and directed tangentially with respect to the first tapered body surface 21, and has a substantial component $B_{N1}$ directed along a normal to the first tapered body surface 21.

The stator assembly 40 includes a stator body 42 having a cavity 44. The cavity 44 has a first cavity end 44a and a second cavity end 44b, as well as a central cavity axis 46 passing through the center of the first cavity end 44a and the second cavity end 44b. The rotor assembly 12 is disposed in the cavity 44 of the stator body 42. The stator assembly 40 also includes a tapered array of shorted conducting circuits 48 (hereinafter array of shorted circuits 48) supported by the stator body 42. An inner profile 48p of the array of shorted circuits defines a tapered shape that extends toward the first cavity end 44a. The tapered shape of the inner profile 48p is complementary to the first tapered body surface 21.

During rotation of the rotor assembly 12, the first magnetic field from the tapered magnetic ring 22 induces currents in the array of shorted circuits 48 due to changes in magnetic flux through the array of shorted circuits 48. The induced currents produce a second magnetic field from the array of shorted circuits 48. The first magnetic field interacts with the second magnetic field producing a repulsive force between the tapered magnetic ring 22 and the array of shorted circuits 48. The repulsive force has an axial component which acts to oppose axial movement of the rotor body 114 toward the first cavity end 134a. The repulsive force also has a radial component which acts to center the rotor body 114 radially until the central body axis 116 overlays the central cavity axis 136. The repulsive force provides a passive magnetic bearing. Details of the passive magnetic bearing are discussed below with respect to FIGS. 7A and 7B. The repulsive force is only produced when the rotor body 114 is rotating. Until the rotor assembly 12 is rotating fast enough to produce sufficient repulsive force to support the rotor assembly, the rotational apparatus must use a different bearing system. Rotational apparatus 110 may include one or more "touchdown bearings" 37, formed of a polymer or other suitable material, which act as bearings for the rotational apparatus 110 when the rotor assembly 12 is rotating at slower than the critical rotation critical, for example during spin-up and touchdown. Embodiments of the present invention may use any suitable form of touchdown bearing or combination of touchdown bearings, for example polymer bearings, hydrodynamic bearings, etc.

According to the teachings of the present invention, the same tapered magnetic ring 22 used to provide magnetic bearing means may be used to generate power and/or generate magnetic torque on the rotor assembly 14. The rotational apparatus 10 may also include non-shorted conducting circuits 36. During rotation of the rotor assembly 12, the magnetic field from the tapered magnetic ring 22 may also induce currents in the non-shorted conducting circuits 36 forming an alternating current generator. External alternating currents may be applied to the non-shorted conducting circuits 36 to create a magnetic field that interacts with the magnetic field of the tapered magnetic ring 22 to produce torque on the rotor assembly 12 forming a motor. Examples of different arrangements of the non-shorted conducting circuits are described below with respect to FIGS. 7A, 7B, 8A and 8B.

The rotational apparatus 10 may have magnetic bearings formed at both the first end 14a and at the second end 14b of the rotor apparatus 12 as depicted, according to the teachings of the present invention. The rotor body 14 may include a second tapered portion 30 having a second tapered body surface 31 extending along the central body axis 16 and tapering in the direction of the second body end 14b. The tapered magnetic ring 22 may include a second plurality of magnetic arrays 34. The second plurality of magnetic arrays 34 are arranged and oriented such that a magnetic field produced by the second plurality of magnetic arrays 34 measured at the second tapered body surface 31 has a substantial component $B_{T2}$ directed tangentially with respect to the central body axis 16 and directed tangentially with respect to the second tapered body surface 31, and has a substantial component $B_{N2}$ directed along a normal to the first tapered body surface 31. According to aspects of the present invention the first plurality of magnetic arrays 24 may be formed in one piece with the second plurality of magnetic arrays 34.

The stator assembly 40 may also include a second tapered array of shorted conducting circuits 58 (hereinafter second array of shorted circuits 58) supported by the stator body 42. An inner profile 58p of the second array of shorted circuits defines second a tapered shape that extends toward the second cavity end 44b. The second tapered shape of the inner profile 58p is complementary to the second tapered body surface 31. Different embodiments showing a magnetic bearing present at only one end of the rotor apparatus 14 are described below with respect to FIGS. 9 and 10.

Figure 2A:
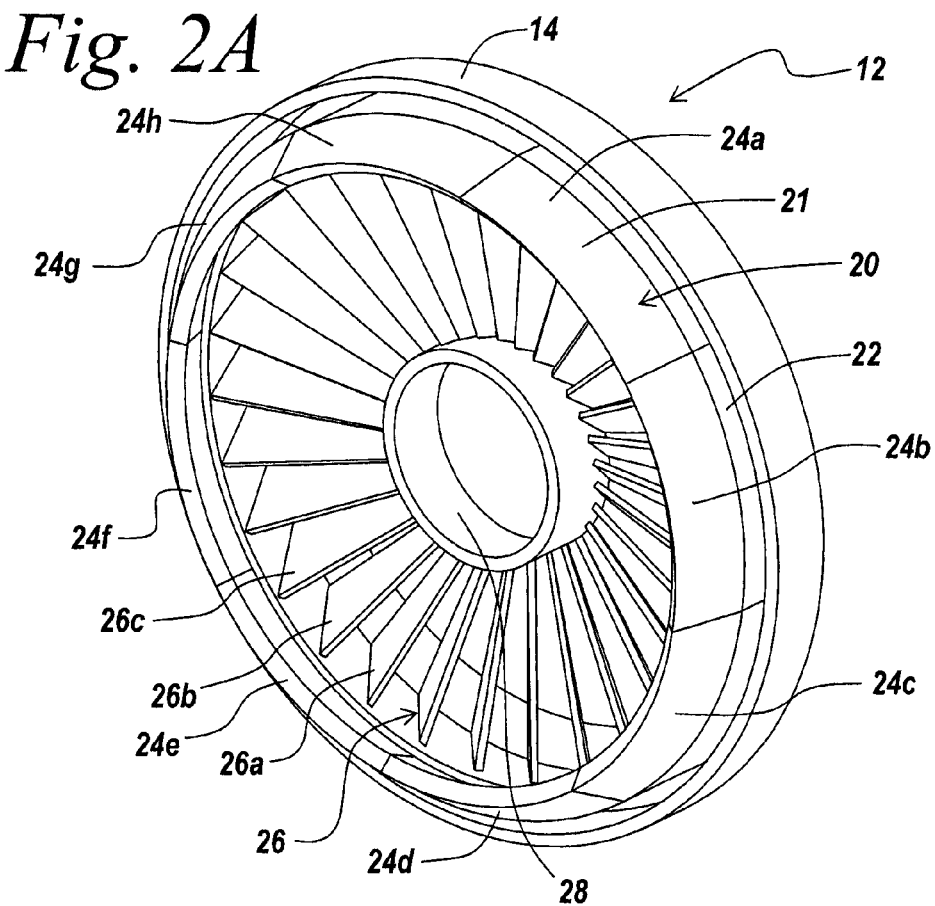
FIG. 2A depicts a perspective view of exemplary rotor assembly, according to the teachings of the present invention.
Figure 2B:
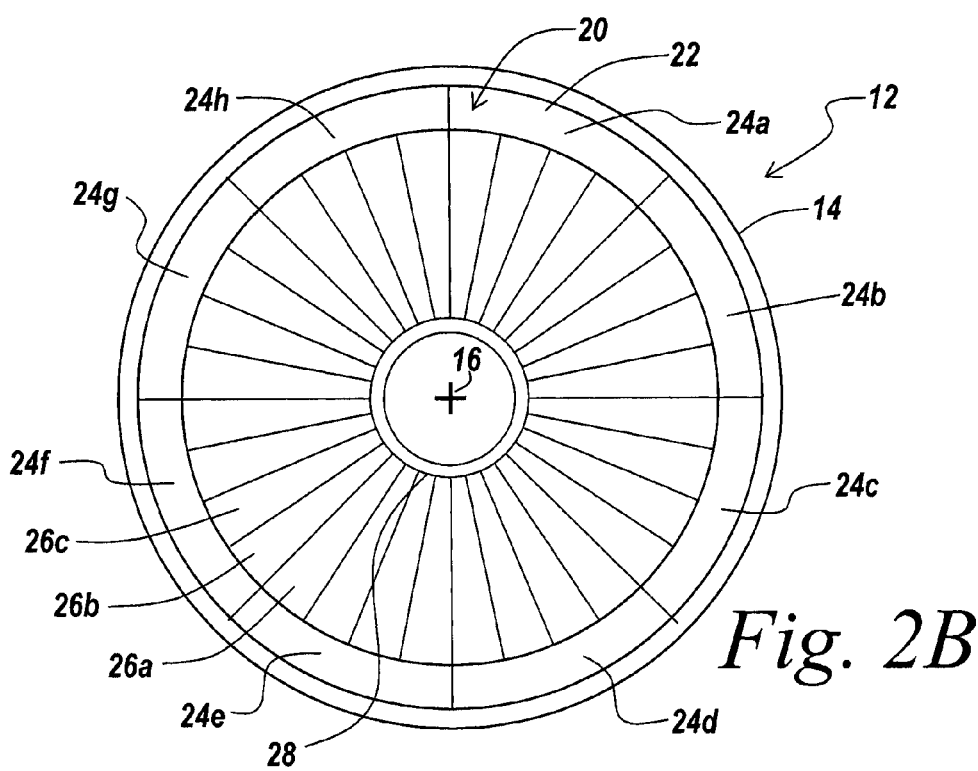
FIG. 2B depicts an axial view of the rotor assembly shown in FIG. 2A.

FIG. 2A depicts a perspective view and FIG. 2B depicts an axial view of the rotor assembly 12. According to the teachings of the present invention, the rotor body 14 may also include rotor blades 26a, 26b, 26c . . . . For purposes of facilitating explanation, the rotor body will be described as having four blades; although the rotor may have any number of blades. The rotor blades 26a, 26b, 26c . . . transform fluid flow into rotation of the rotor assembly 12 and transform rotation of the rotor assembly into fluid flow 12. The rotor blades 26a, 26b . . . may connect with an inner body ring 28. One of ordinary skill in the art will appreciate that the rotor blades 26a, 26b . . . may have a different shape or a different form than those depicted herein. As used herein, the term rotor blade encompasses different elements used to transform between fluid flow and rotational motion including, but not limited to turbine blades, impellor blades and fan blades. Some methods and techniques that may be used for producing an exemplary rotor assembly are discussed in detail in the related application MTB-002 entitled "Magnetic Composites," filed concurrently herewith.

Figure 3A:
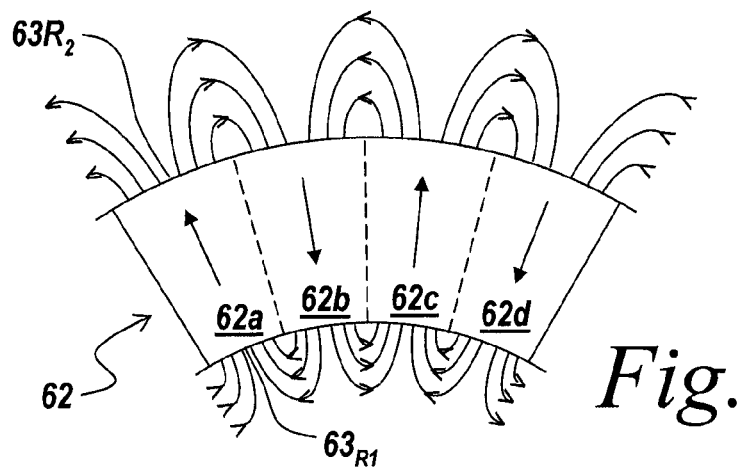
FIG. 3A depicts an axial view of a standard magnetic array.
Figure 3B:
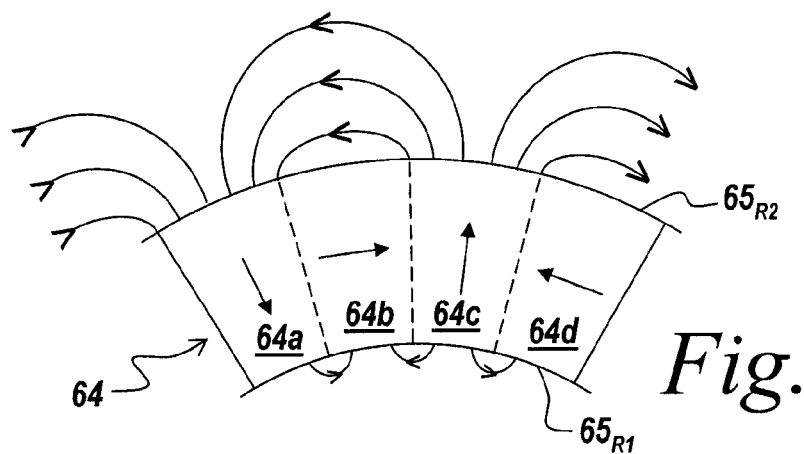
FIG. 3B depicts an axial view a four segment magnetic Halbach array.
Figure 3C:
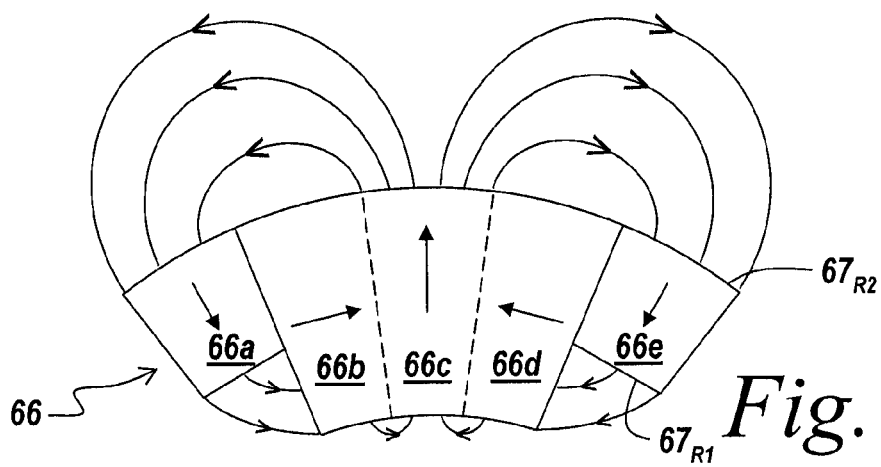
FIG. 3C depicts an axial view a five segment magnetic Halbach array, according to the teachings of the present invention.

The exemplary tapered magnetic ring 22 is depicted with eight magnetic arrays 24a, 24b, . . . 24h solely for illustrative purposes. One of ordinary skill in the art will appreciate that a tapered magnetic ring 22 having a larger number of magnetic arrays, and a tapered magnetic ring 22 having a smaller number of magnetic arrays also fall within the scope of the present invention. FIGS. 3A, 3B and 3C illustrate some different embodiments of magnetic arrays that may be incorporated into the tapered magnetic ring 22, according to the teachings of the present invention.

FIG. 3A illustrates an axial view of a standard magnetic array 62 with four sections 62a, 62b, 62c, 62d. An arrow within each section 62a, 62b, 62c, 62d indicates the magnetic alignment for that section. The magnetic alignment flips from outward in the first section 62a, to inward in the second section 62b. The third section 63c has an outward alignment, which flips to an inward alignment for the fourth section 63d. Over the four sections 62a, 62b, 62c, 62d the alignment "flips" through two complete cycles.

The lines outside the magnetic array 62 graphically illustrate magnetic field lines produced by the four sections 62a, 62b, 62c, 62d. It should be noted that the magnetic alignment for each section 62a, 62b, 62c, 62d and some of the magnetic field lines also have out-of-plane components that are not apparent in this axial view. The magnetic field lines are drawn assuming that the array 62 has a similar type arrays on either side. For each section 62a, 62b, 62c, 62d, magnetic field lines from a center of the section are oriented perpendicular to an inner edge $63_{R1}$ and an outer edge $63_{R2}$ of the array. Magnetic field lines between sections are oriented parallel to the inner edge $63_{R1}$ and the outer edge $63_{R2}$ of the array. The standard magnetic array 62 has a substantial magnetic field extending outward from the outer edge $63_{R2}$ of the array and a substantial magnetic field extending from the inner edge $63_{R1}$ of the array toward through the rotor body 14 toward the central body axis (not depicted).

FIG. 3B illustrates an axial view of a magnetic Halbach array 63 with four sections 64a, 64b, 64c, 64d. The first section 64a of the magnetic Halbach array 63 has an inward magnetic alignment. The second section 64b has a magnetic alignment pointing toward the third section 64c. The third section 64c has a magnetic alignment pointing outward. The fourth section 64d has a magnetic alignment pointing back toward the third section 64c. In the four sections 64a, 64b, 64c, 64d of the magnetic Halbach array 64, the alignment rotates through only one cycle, as opposed to two cycles in the standard magnetic array 62.

The unique characteristics of the magnetic Halbach array 64 is illustrated by the magnetic field lines. The magnetic field does not substantially extend into the rotor body 14 beyond the inner edge $65_{R1}$ of the Halbach array. In contrast, the magnetic field is amplified outward beyond the outer edge $65_{R2}$ of the array. It may be desirable to minimize the magnetic fields extending into the rotor body 14. However, a tapered magnetic ring including magnetic Halbach arrays 64 may be more complicated and expensive to manufacture than a tapered magnetic ring including standard magnetic arrays 62.

In both FIG. 3A and FIG. 3B the magnetic field lines are drawn assuming that the magnetic array is adjacent to similar type arrays on either side forming a continuous ring of arrays. However, if the arrays are not adjacent to similar type arrays then stray magnetic field lines may result. FIG. 3C illustrates a five segment magnetic Halbach array 66 which reduces stray magnetic fields at the abrupt ends of the array 66. In the five segment magnetic Halbach array, the end segments 66a and 66e are designed produce a weaker field than the non-end segments 66b, 66c, 66d. The field in the end segments 66a, 66c may be weaker because the segments are thinner, as shown, the end segments 66a, 66c may be have a different material composition than the non-end segments 66b, 66c, 66d, or the end segments 66a and 66e may be initially magnetized with a weaker field. One of ordinary skill in the art will appreciate that many different methods may be used to produce the weaker end segments 66a, 66e, in the five segment magnetic Halbach array 66.

The magnetic "field lines" depicted FIGS. 3A, 3B and 3C are only meant to illustrate a general direction of the magnetic field at different locations, and are not meant to represent rigorous and accurate depictions of the magnetic field at different locations. Additionally, the density of the magnetic field lines in an area should not be interpreted as indicative of magnetic field strength in the area.

Figure 4A:
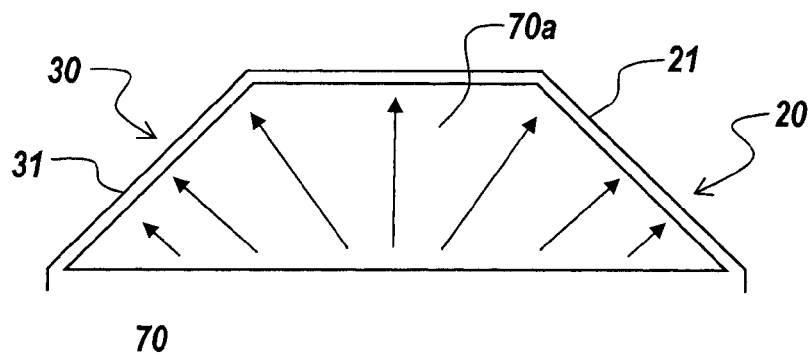
FIG. 4A depicts a side cross-sectional view of a first tapered magnetic ring having continuous segments, according to the teachings of the present invention.
Figure 4B:
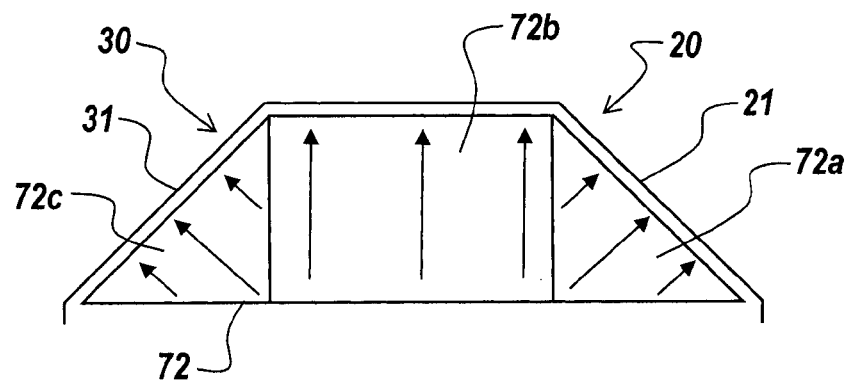
FIG. 4B depicts a side cross-sectional view of a different tapered magnetic ring including segments divided into sections, according to the teachings of the present invention.
Figure 4C:
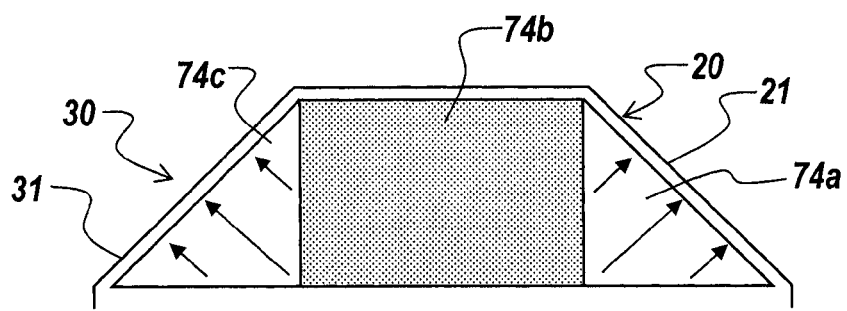
FIG. 4C depicts a side cross-sectional view of a tapered magnetic ring including segment divided into magnetic and non-magnetic sections, according to the teachings of the present invention.

FIGS. 4A, 4B and 4C depict different embodiments of a magnetic array in the tapered magnetic ring 22, according to the teachings of the present invention. FIG. 4A illustrates a side cross-sectional view of a magnetic array 70 with a segment having one section 70a that extends from the first tapered portion 20 of the rotor body to the second tapered portion 30 of the rotor body. An orientation of the magnetization of the section 70a rotates from a first orientation perpendicular to the first tapered body surface 21 in the first tapered portion 20 to a second orientation perpendicular to the second tapered body surface 31 in the second tapered portion 30 as indicated by arrows.

In another embodiment depicted in FIG. 4B, a magnetic array 72 includes a segment with three different sections: a section 72a in the first tapered portion 20 of the rotor body, a section 72c in the second tapered portion 30 of the rotor body, and a section 72b between the first tapered portion 20 and the second tapered portion 30 of the rotor body. Each section is magnetized with a different orientation as indicated by arrows. In section 72a the magnetization is perpendicular to the first tapered body surface 21, and in section 72c the magnetization is perpendicular to the second tapered body surface 31. In section 72b the magnetization is directed radially outward from the central body axis (not shown). In yet another embodiment depicted in FIG. 4C, a magnetic array 74 includes a segment having two magnetized sections: a section 74a in the first tapered portion 20 of the rigid body, and a section 74c in the second tapered portion 30 of the rigid body. Between the magnetized sections 74a, 74c is an nonmagnetized section 74b.

Figure 5A:
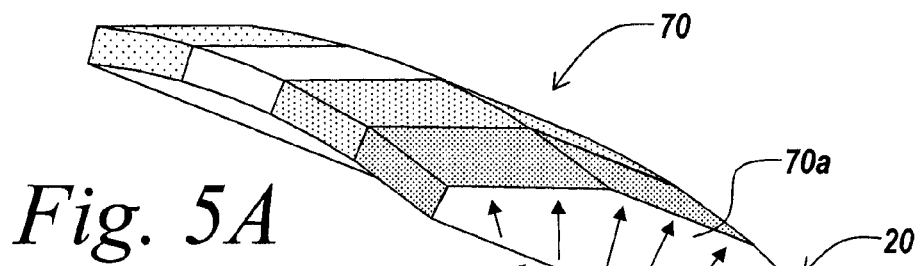
FIG. 5A depicts an expanded perspective view of a part of the tapered magnetic ring depicted in FIG. 4A, according to the teachings of the present invention.
Figure 5B:
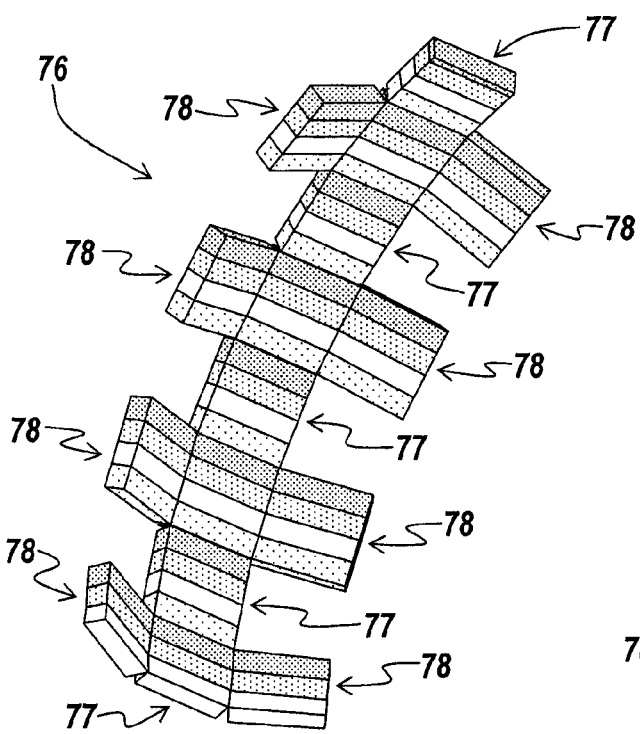
FIG. 5B depicts a perspective view of a part of a different tapered magnetic ring, according to the teachings of the present invention.
Figure 5C:
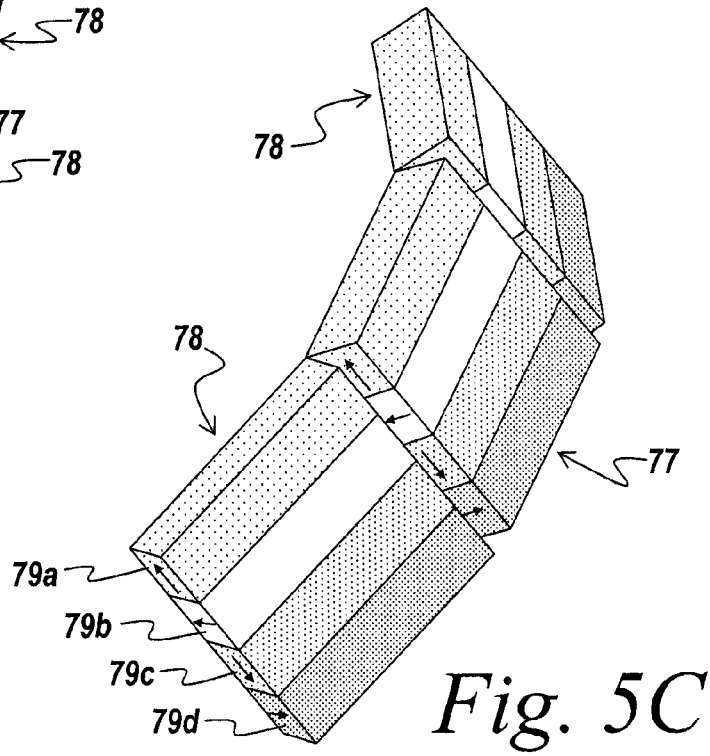
FIG. 5C depicts an expanded perspective view of one magnetic array in the tapered magnetic ring depicted in FIG. 5B.

FIGS. 5A, 5B and 5C illustrate perspective views of different embodiments of the tapered magnetic ring. For clarity, only the magnetized portions of the magnetic ring are shown. FIG. 5A depicts a perspective view of the magnetic array 70 illustrated in FIG. 4A, according to the teachings of the present invention. In this embodiment each magnetic segment may be a single section 70a with a magnetic orientation that gradually changes across a width of the section 70a.

FIG. 5B depicts a perspective view of a portion of another embodiment of a tapered magnetic ring 76 with non-continuous tapered magnetic arrays 78. In this embodiment, the tapered magnetic ring 77 includes a continuous ring of non-tapered magnetic arrays 77 and non-continuous rings of tapered magnetic arrays 78. FIG. 5C is an enlarged perspective view of one non-tapered magnetic array 77 and two adjacent tapered magnetic arrays 78. In this embodiment "taper" refers to an orientation of a magnetic array and not to the shape of the magnetic array. The tapered magnetic arrays 78 and the non-tapered magnetic arrays 77 are depicted as magnetic Halbach arrays solely for illustrative purposes. Embodiments depicted in FIGS. 5B and 5C provide tapered magnetic arrays 78 for both magnetic bearings and power generation/torque, and provide separate non-tapered magnetic arrays 77 that can be used for power generation/torque.

Figure 6A:
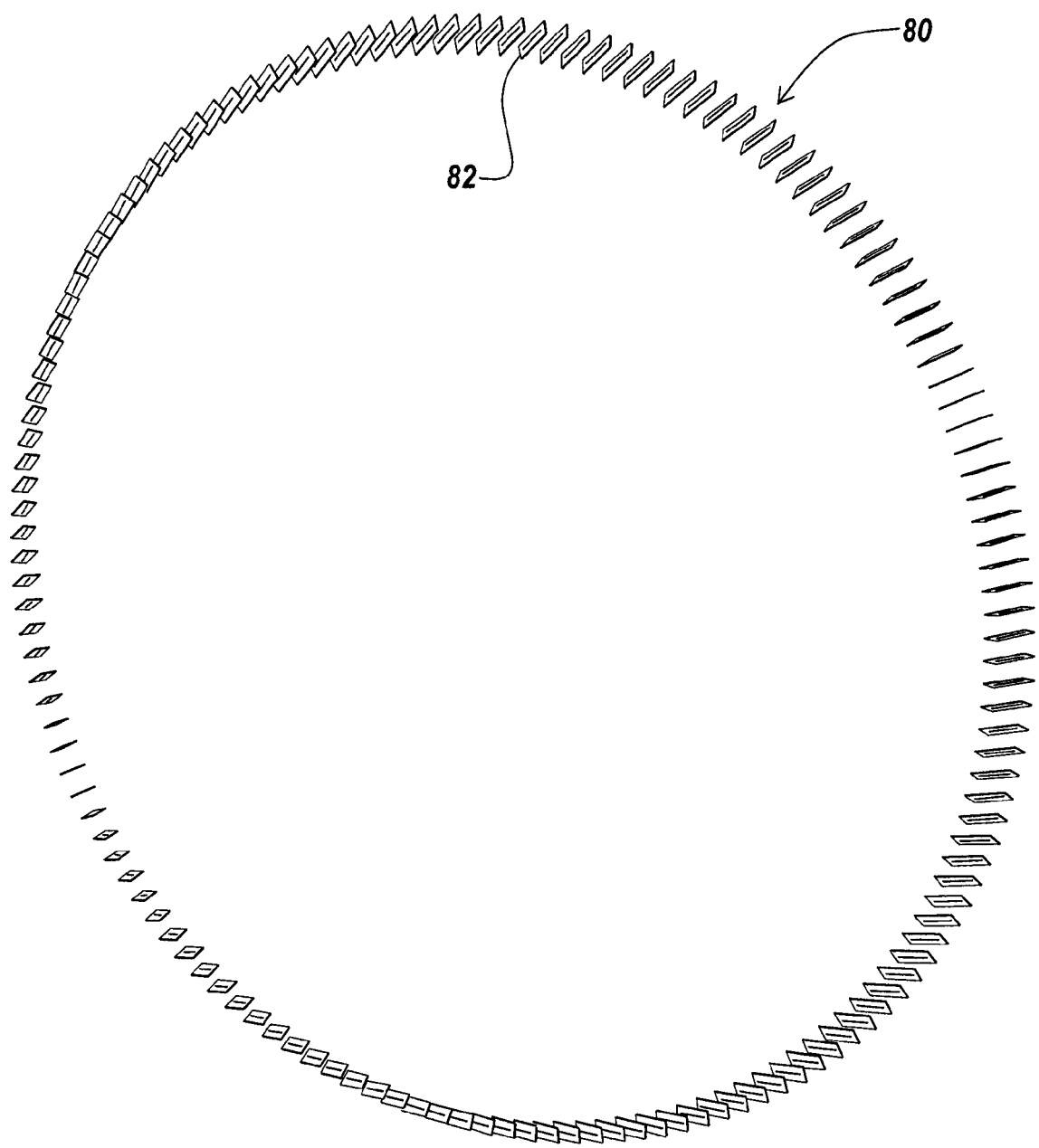
FIG. 6A depicts a perspective view of an embodiment of a tapered array of shorted conducting circuits, according to the teachings of the present invention.
Figure 6B:
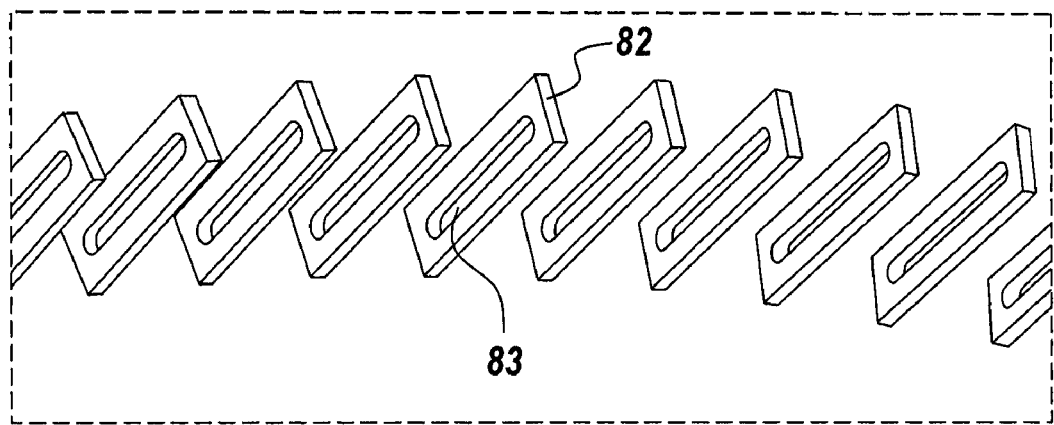
FIG. 6B depicts an enlarged perspective view of a portion of the tapered array depicted in FIG. 6A.
Figure 6C:
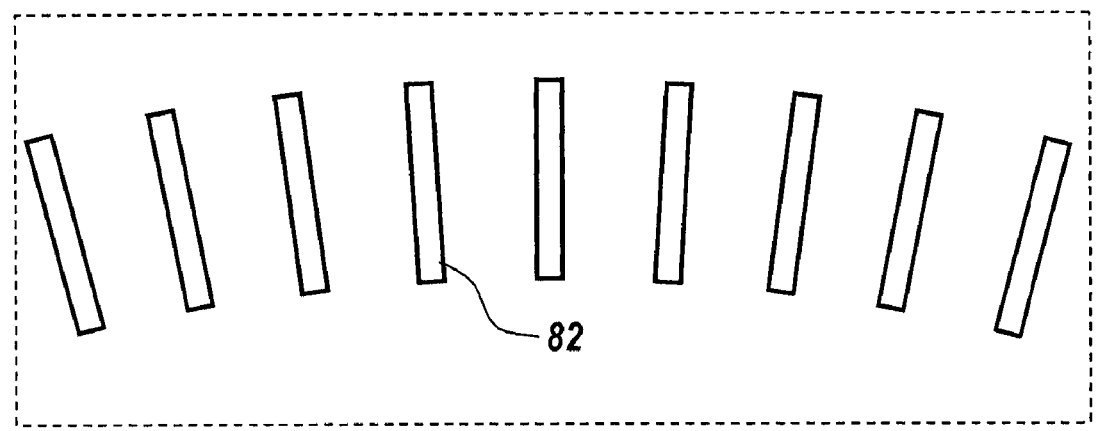
FIG. 6C depicts an axial view of a portion of the tapered array depicted in FIG. 6A.

A tapered magnetic ring, having a plurality of magnetic arrays, in combination with a tapered array of shorted conducting circuits forms a passive magnetic bearing. FIGS. 6A, 6B and 6C illustrate an embodiment of a tapered array of shorted conducting circuits 80 (hereinafter array of shorted circuits), according to the teaching of the present invention. FIG. 6A depicts a perspective view of the array of shorted circuits 80. FIG. 6B depicts an enlarged perspective view of a part of the array of shorted circuits 80. An individual shorted conducting circuit 82 may have a substantially rectangular planar shape with a slot 83 formed through the rectangular planar shape 83. Changes in magnetic flux through the slot 83 induce current in the individual shorted conducting circuit 83. FIG. 6C depicts a view of part of the array of shorted circuits 80 along an axial direction with respect to the central body axis (not shown). Each individual shorted conducting circuit 83 may be substantially co-planar with the central body axis as illustrated in FIG. 6C.

Figure 7A:
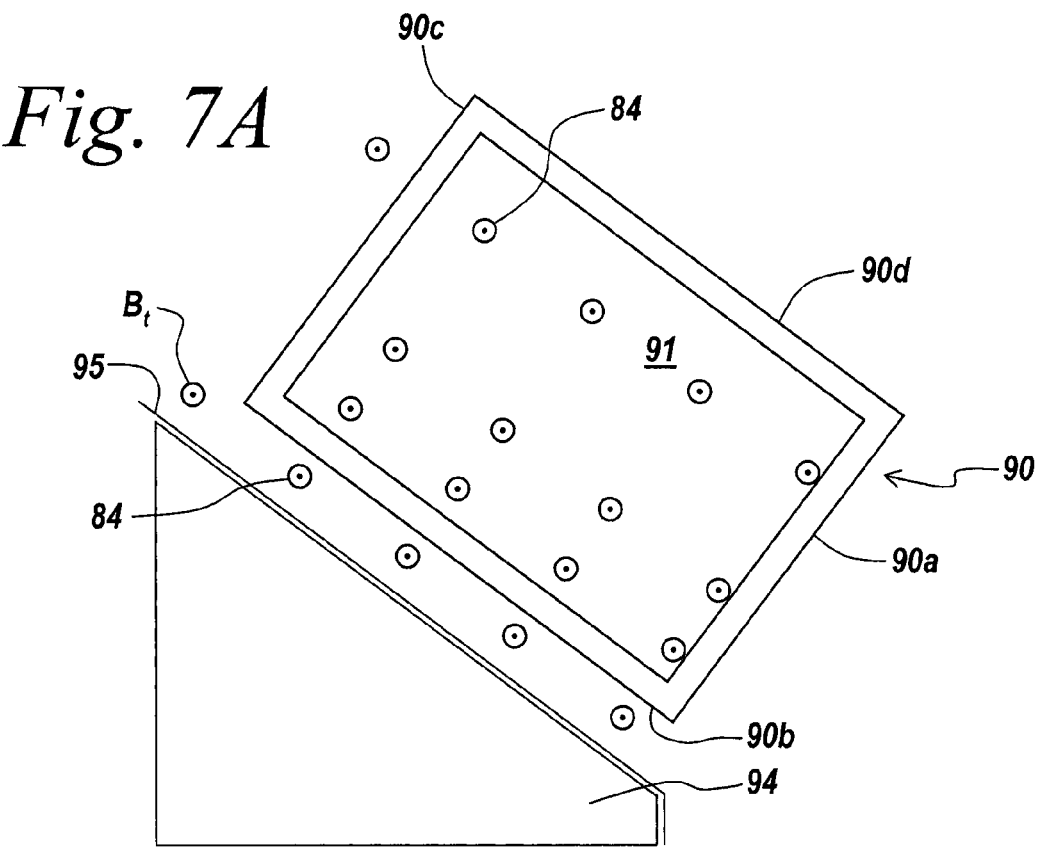
FIG. 7A depicts a side cross-sectional view of a shorted conducting circuit and a magnetic array to illustrate a first magnetic field generated by the magnetic array.
Figure 7B:
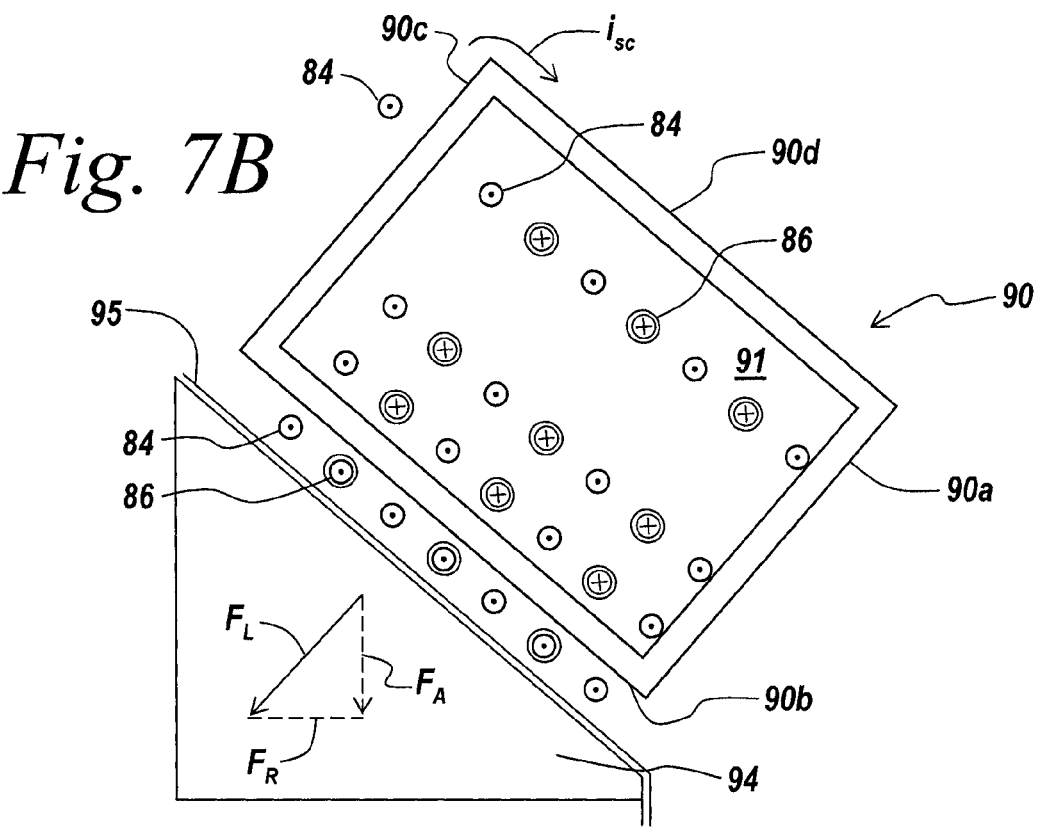
FIG. 7B also depicts a side cross-sectional view of the shorted conducting circuit and the magnetic array to induced magnetic repulsive forces between the shorted conducting circuit and the magnetic array.

FIGS. 7A and 7B present another embodiment of a shorted conducting circuit 90 as well as illustrating magnetic forces generated between the shorted conducting circuit 90 and a magnetic array 94. Shorted conducting circuit 90 is formed of four segments; segments 90a and 90c are perpendicular to a first tapered body surface 95, and segments 90b and 90d are parallel to the first tapered body surface 95. The segments 90a, 90b, 90c, 90d enclose an area 91.

FIG. 7A illustrates first magnetic field lines 84 from a first magnetic field produced by the tapered magnetic array 94 that are perpendicular to a plane of the shorted conducting circuit 90. Changes in the magnetic flux through the area 91 induce a time varying current $i_{SC}$ in the shorted conducting circuit 90. The time varying current $i_{SC}$ induced in the shorted circuit 90 produces a magnetic field 86 that opposes the change in magnetic flux through area 91.

FIG. 7B illustrates both the magnetic field 84 directly produced by the magnetic array 94 and the second magnetic field 86 produced by the induced currents. The second magnetic field 86 acts to oppose the changes in the magnetic flux through the shorted conducting circuit 90; however, the second magnetic 86 field is in the same direction as the first magnetic field 84 between the shorted circuit segment 90b and the magnetic array 94. The interaction of the first magnetic field 84 produced by the magnetic array 94 and the second magnetic field 86 produced by changing flux through the shorted conducting circuit 90 results in a repulsive force $F_L$ between the magnetic array 94 and the shorted conducting circuits 90.

The repulsive force $F_L$ has both an axial component $F_A$ directed parallel to the central body axis, and a radial component $F_R$ directed in a radial direction with respect to the central body axis. The repulsive force $F_L$ increases with decreasing distance between the magnetic array 94 and the shorted conducting circuit 90. As the distance between the magnetic array 94 and the shorted conducting circuit 90 approaches zero the repulsive force $F_L$ approaches infinity (theoretically); thus, the restoring force $F_L$ functions as a magnetic bearing to prevent contact between the magnetic array 94 of the rotor assembly 12 and the shorted conducting circuit 90 of the stator assembly 40. The restoring force $F_L$ also acts to center rotor assembly 12 until the central body axis 16 is in the same as the central cavity axis 46 of the stator assembly 40. In an embodiment with a tapered array of shorted conducting circuits at both ends of the rotor assembly, the restoring forces at each end act to maintain the rotor assembly at a particular position along the central cavity axis.

Figure 8A:
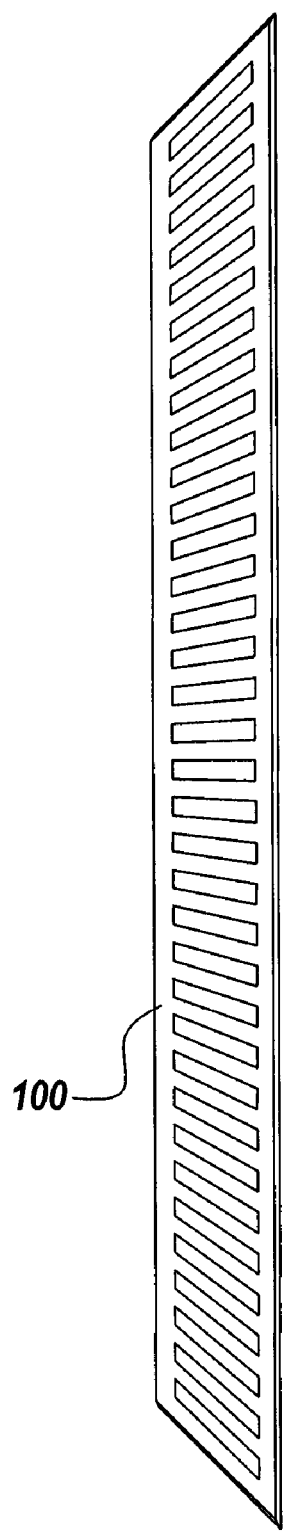
FIG. 8A depicts a side cross-sectional view of a tapered array of shorted conducting circuits in the form of a tapered slotted band, according to the teachings of the present invention.
Figure 8B:
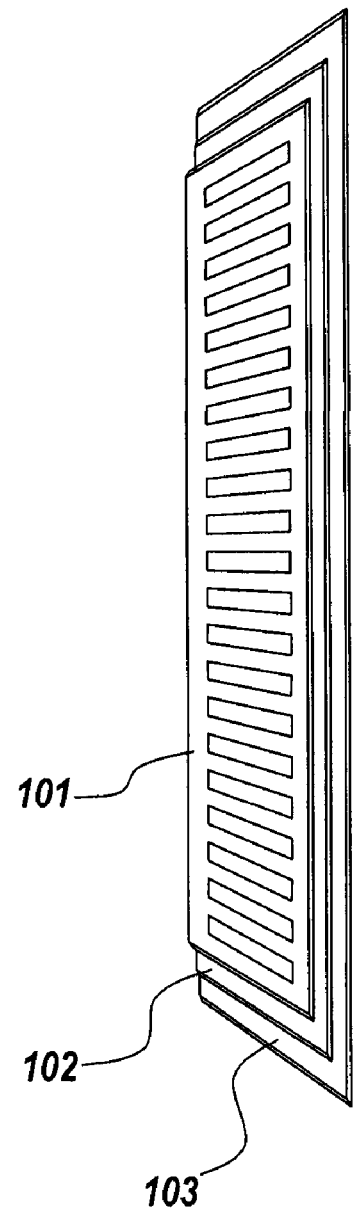
FIG. 8B depicts a side cross-sectional view of a tapered array of shorted conducting circuits in the form of three nested tapered slotted bands, according to the teachings of the present invention.

FIGS. 8A and 8B illustrate additional embodiments of a tapered array of shorted conducting circuits. FIG. 8A depicts a tapered array of shorted conducting circuits (hereinafter array of shorted circuits) in the form of a tapered slotted ring 100. Unlike the array of shorted conducting circuits 48 described above that is sensitive to changes in magnetic flux in a direction tangential to both a first tapered body surface and the central body axis, the tapered slotted ring 100 is sensitive to changes in magnetic flux in a direction normal to the first tapered body surface.

FIG. 8B depicts a tapered array of shorted conducting circuits formed of three tapered slotted rings 101, 102, 103. The rings are insulated with respect to each other so that changes in magnetic flux can induce current in each of the three tapered slotted rings 101, 102, 103 simultaneously. This greatly increases a total induced current and a resulting magnetic field. One of ordinary skill in the art will appreciate that that the tapered arrays of shorted conducting circuits presented herein are merely illustrative of a wide range of tapered arrays of shorted conducting circuits according to the teachings of the present invention.

Figure 9:
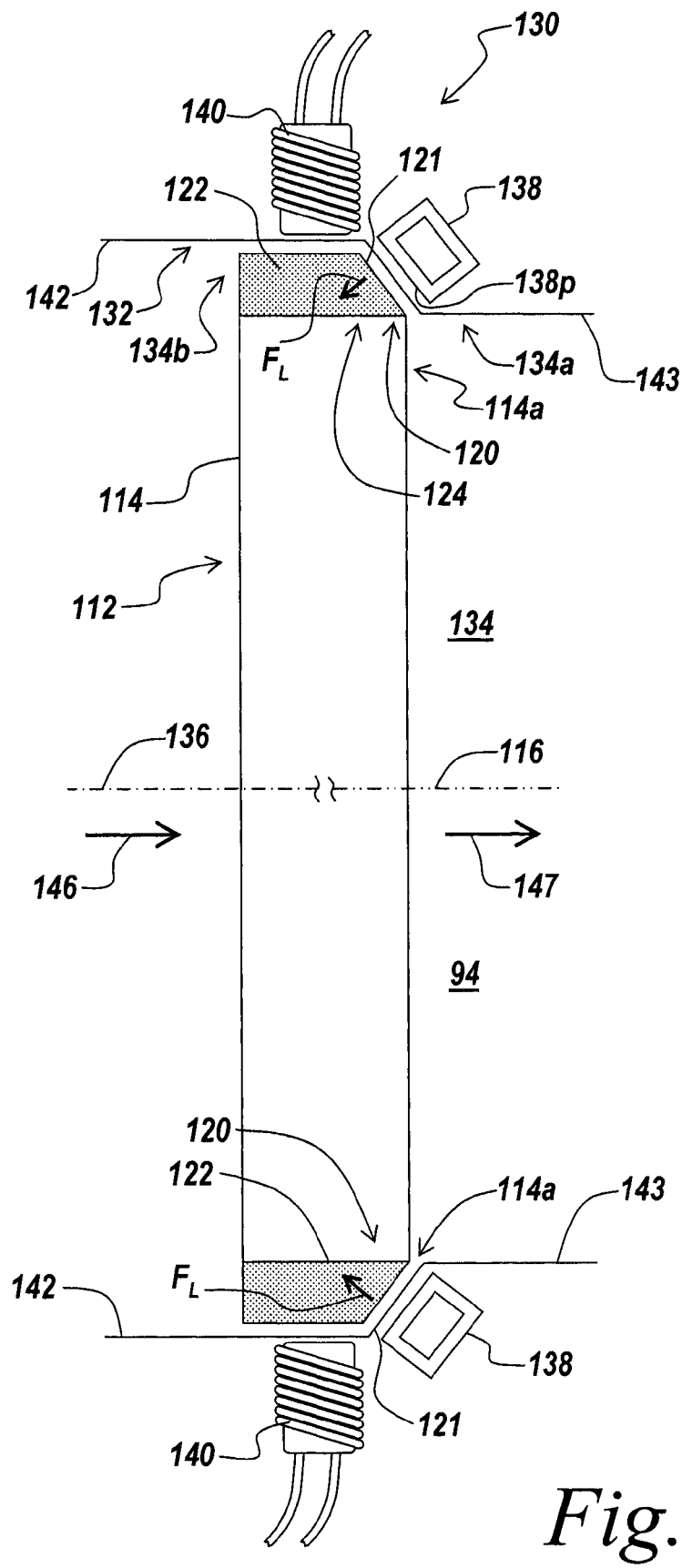
FIG. 9 depicts a side cross-sectional view of another embodiment of the rotational apparatus having magnetic bearing means on only one end, according to the teachings of the present invention.

FIG. 9 illustrates an embodiment of the rotational apparatus 110 with a passive magnetic bearing on one end according to the teachings of the present invention. This type of rotational apparatus 100 may be used for a fluid driven electric generator in which the fluid only flows in one direction. The rotational apparatus 110 includes a rotor assembly 112 and a stator assembly 130. The rotor assembly 112 includes a rotor body 114 having a first body end 114a and a central body axis 116 passing through a center of the first body end 114a.

The rotor body 114 includes a tapered portion 120 having a tapered body surface 121, where the tapered portion 120 extends along the central body axis 116 and tapers in a direction of the first body end 114a. The rotor body 114 also includes a tapered magnetic ring 122 at the tapered portion 120 of the rotor body. The tapered magnetic ring 122 includes a plurality of magnetic arrays 124 that produce a magnetic field. The magnetic field measured at the tapered body surface 121 has a substantial component directed tangentially with respect to the central body axis 116 and directed tangentially with respect to the tapered body surface 121. The magnetic field produced by the plurality of magnetic arrays 124 also has a substantial component directed along a normal to the tapered body surface 121.

The stator assembly 130 includes a stator body 132 having cavity 134 with a first cavity end 134a, a second cavity end 134b and a central cavity axis 136 passing through the center of the first cavity end 134a and the second cavity end 134b. The stator assembly 130 also includes a tapered array of shorted conducting circuits 138 (hereinafter shorted conducting array). The shorted conducting array 138 has an inner profile 138p that defines a tapered shape extending toward the first cavity end 134a. The tapered shape of the inner profile 138p is complementary to the tapered body surface 12 of the rotor body 114. The stator assembly 130 can also include non-shorted conducting circuits 140 that can produce electric current from rotation of the rotor assembly 112, or can use alternating current to exert magnetic torque forces on the rotor body 114, or both.

Rotational apparatus 110 may be used to generate electricity from fluid flow. The cavity 134 of the stator body may connect with an inlet 142 at a second cavity end 134b and may connect with an outlet 143 at a first cavity end 134a. Fluid flows into the cavity through the inlet 142 (as indicated by arrow 146), causes rotation of the rotor body 114 and flows out of the cavity though the outlet 143 (as indicated by arrow 147). As the rotor body 114 rotates, individual conducting circuits in the array of conducting circuits 138 each experience changing magnetic flux from the first magnetic field which induces current in each circuit. The induced currents produce a second magnetic field which interacts with the first magnetic field to produce a repulsive force between the plurality of magnetic arrays 124 of the rotor assembly 112 and the array of shorted circuits 138 of the stator assembly 130. The repulsive force $F_L$ acts as a magnetic bearing to prevent the tapered portion 120 of the rotor body 114 from touching the array of shorted circuits 138. The repulsive force $F_L$ has both an axial component to oppose axial movement of the rotor body 114 toward the first cavity end 134a, and a radial component that acts to center the rotor body 114 until the central axis 116 of the rotor body is located at the central cavity axis 136. As the rotor body 114 rotates, changing magnetic flux induces time varying currents in the non-shorted conducting circuits 140 to generate alternating current or magnetic torque on the rotor assembly 112.

Embodiments of the present invention may be particularly suited for use in a hydrokinetic power generator. An exemplary rotational apparatus, such as rotational apparatus 110 with a rotor assembly 112 in the form of an impellor, may be used in a hydrokinetic power generator. Fluid flow 142 exerts forces on the impellor causing the impellor to rotate and the rotation of the impellor generates power. Because an exemplary hydrokinetic power generator incorporating an exemplary rotational apparatus 110 primarily uses non-contact passive magnetic bearings, the exemplary hydrokinetic power generator minimizes or eliminates many problems associated with the use of contact bearings in conventional hydrokinetic power generators. The non-contact passive magnetic bearings do not suffer from silt contamination, unlike contact bearings. Additionally, the non-contact passive magnetic bearings do not pose the risk of leakage of lubricating materials into the environment, unlike conventional contact bearings. Because the exemplary hydrokinetic power generator primarily uses passive magnetic bearings, the exemplary hydrokinetic power generator minimizes or eliminates many problems associated with the use of active magnetic bearings in aqueous environments.

Figure 10:
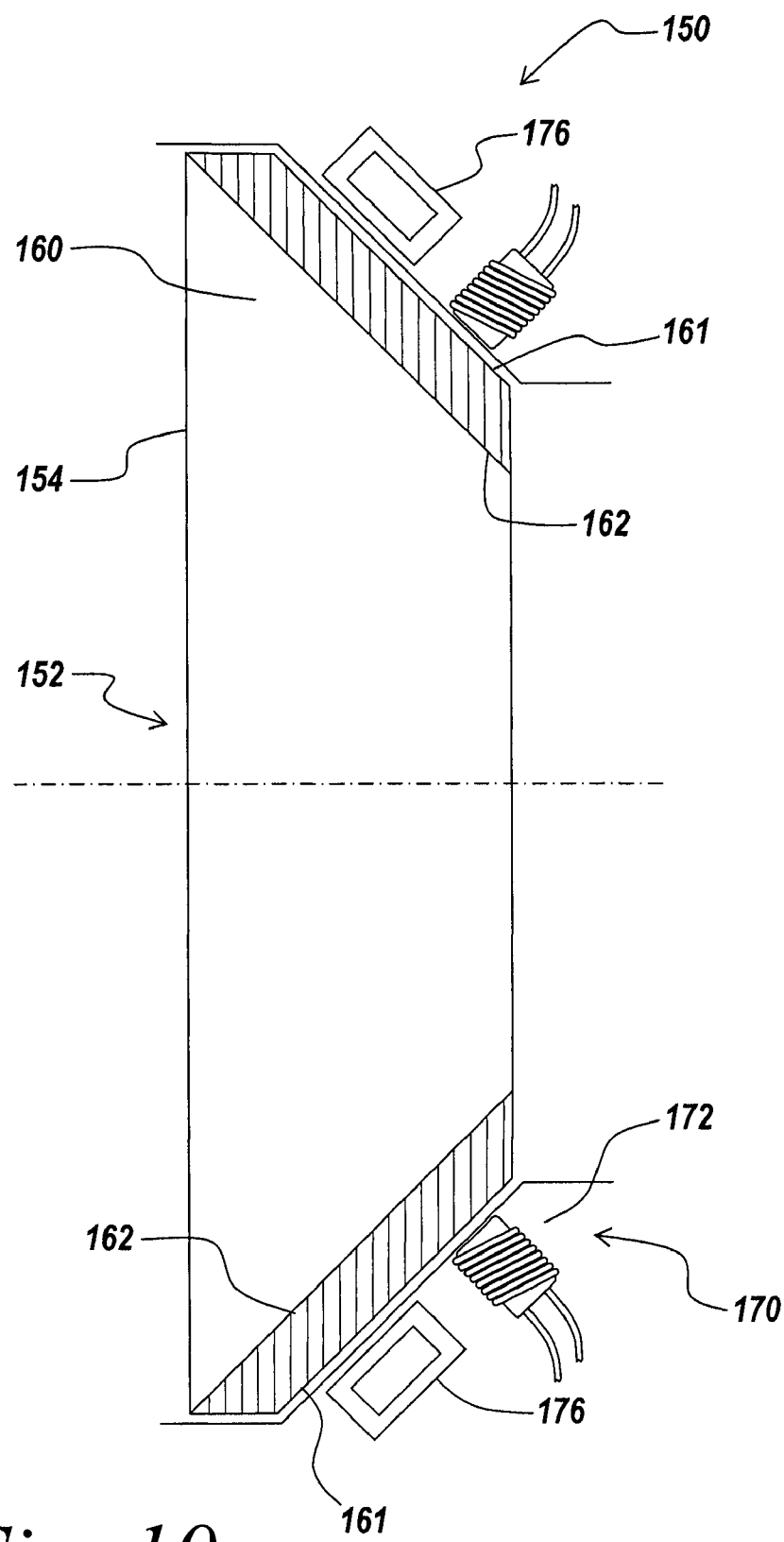
FIG. 10 depicts a side cross-sectional view of another embodiment of the rotational apparatus with non-shorted conducting circuits disposed opposite a tapered body surface, according to the teachings of the present invention.

FIG. 10 illustrates an embodiment of a rotational apparatus 150 having a different rotor body shape and with non-shorted conducting circuits disposed opposite a tapered body surface, according to the teachings of the present invention. Rotational apparatus 150 has a rotor assembly 152 with a rotor body 154 having a tapered portion 160 that includes most of the rotor body 154. The tapered potion 160 has a tapered body surface 161. A tapered magnetic ring 162 is disposed at the first tapered body portion 160.

The rotational apparatus 150 includes a stator assembly 170 having a stator body 172 and a tapered array of a plurality of shorted conducting circuits 176 supported by the stator body 172 and located opposite the tapered body surface 161 of the rotor body 154. The stator assembly 170 also includes non-shorted conducting circuits 180 located opposite the tapered body surface 161 of the rotor body 154. Having the non-shorted conducting circuits 180 located opposite the tapered body surface 161 may be desirable.

Figure 11A:
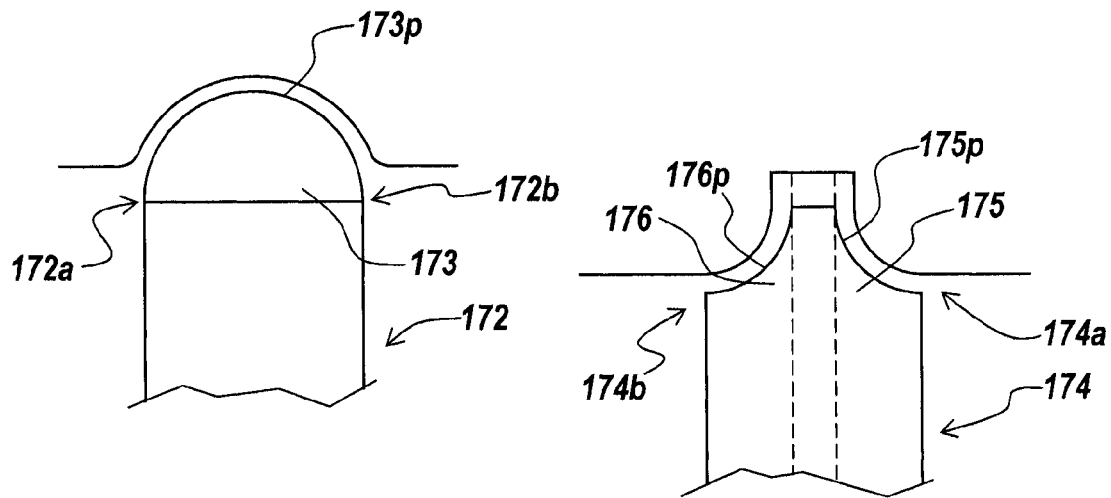
FIG. 11A depicts side cross-sectional views of examples of taper profiles for a tapered portion of a rotor body and a complementary stator assembly profiles having a taper at a first end and at a second end, according to the teachings of the present invention.
Figure 11B:
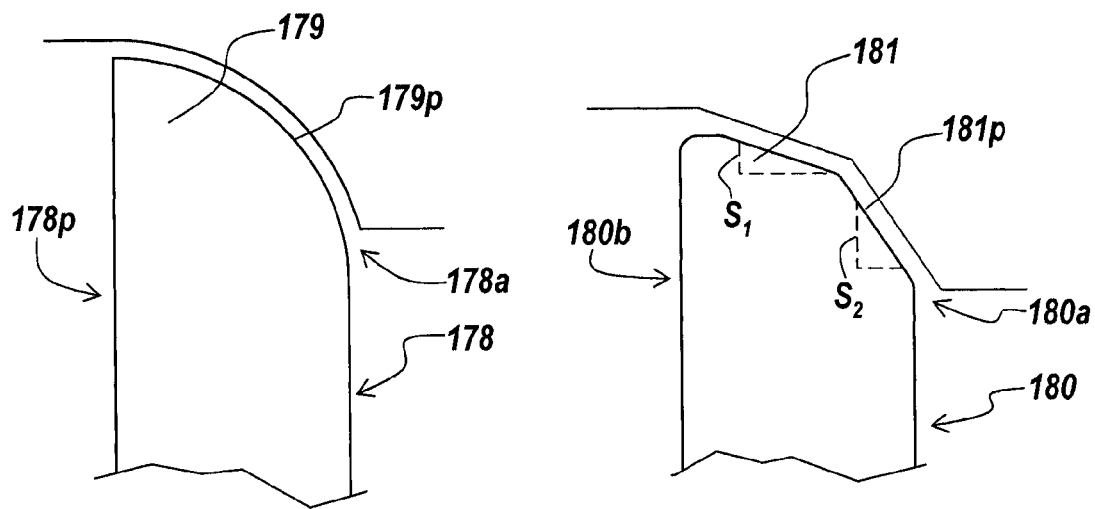
FIG. 11B depicts side cross-sectional views of examples of taper profiles for a tapered portion of a rotor body and a complementary stator assembly profiles having a taper at a first end, according to the teachings of the present invention.

A tapered portion of a rotor body and an inner profile of a tapered array of shorted conducting circuits may have many different taper profiles. FIGS. 11A and 11B illustrate examples of a taper profile for a tapered portion of a rotor body and a complementary stator assembly profile. A rotor body 172 may have a first tapered portion 173 with a round taper profile 173p on a first body end 172a and a second body end 172b. In another example, a rotor body 174 may have a first tapered portion 175 with a concave rounded taper profile 175p on a first body end 174a and a second tapered portion 176 with a concave rounded taper profile 176b on a second body end 174b. Another example of a rotor body 178 may have one tapered portion 179 with a rounded taper profile 179p tapering toward a first body end 178a. Yet another rotor body 180 may have a tapered portion 181 with a taper profile 181p having more than one linear slope $S_1$, $S_2$. One of ordinary skill in the art will appreciate that many other shapes of taper profiles fall within the scope of the present invention.

Figure 12A:
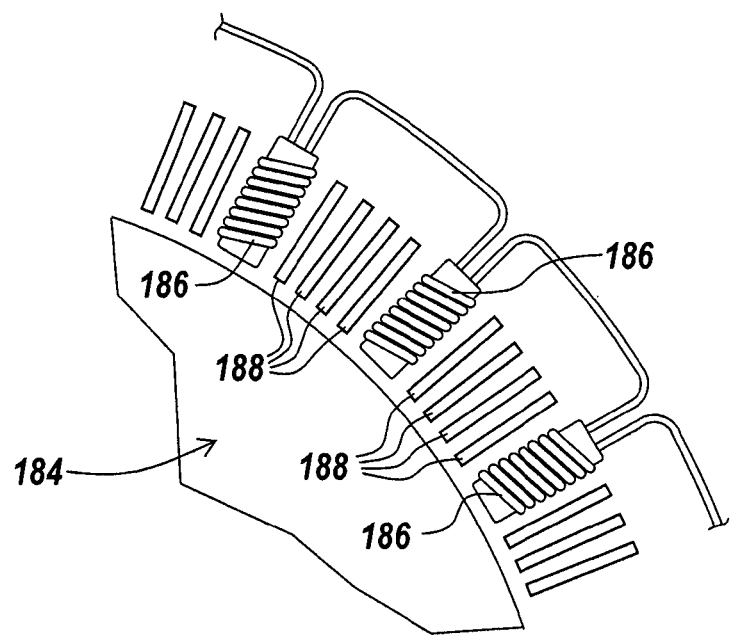
FIG. 12A depicts an axial view of a portion of a stator assembly in which non-shorted conducting circuits are interspersed between shorted conducting circuits, according to the teachings of the present invention.
Figure 12B:
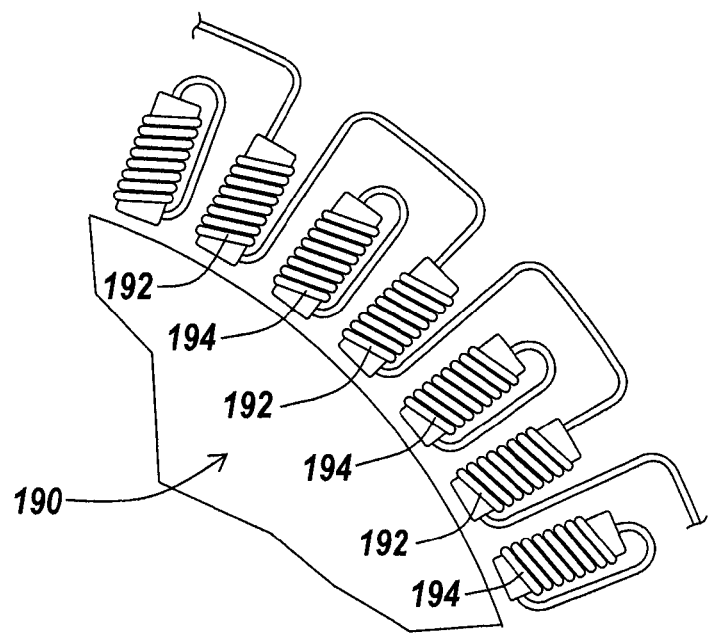
FIG. 12B depicts an axial view of a portion of a stator assembly in which both conducting circuits and non-conducting circuits are oriented parallel to a tapered rotor body surface.
Figure 12C:
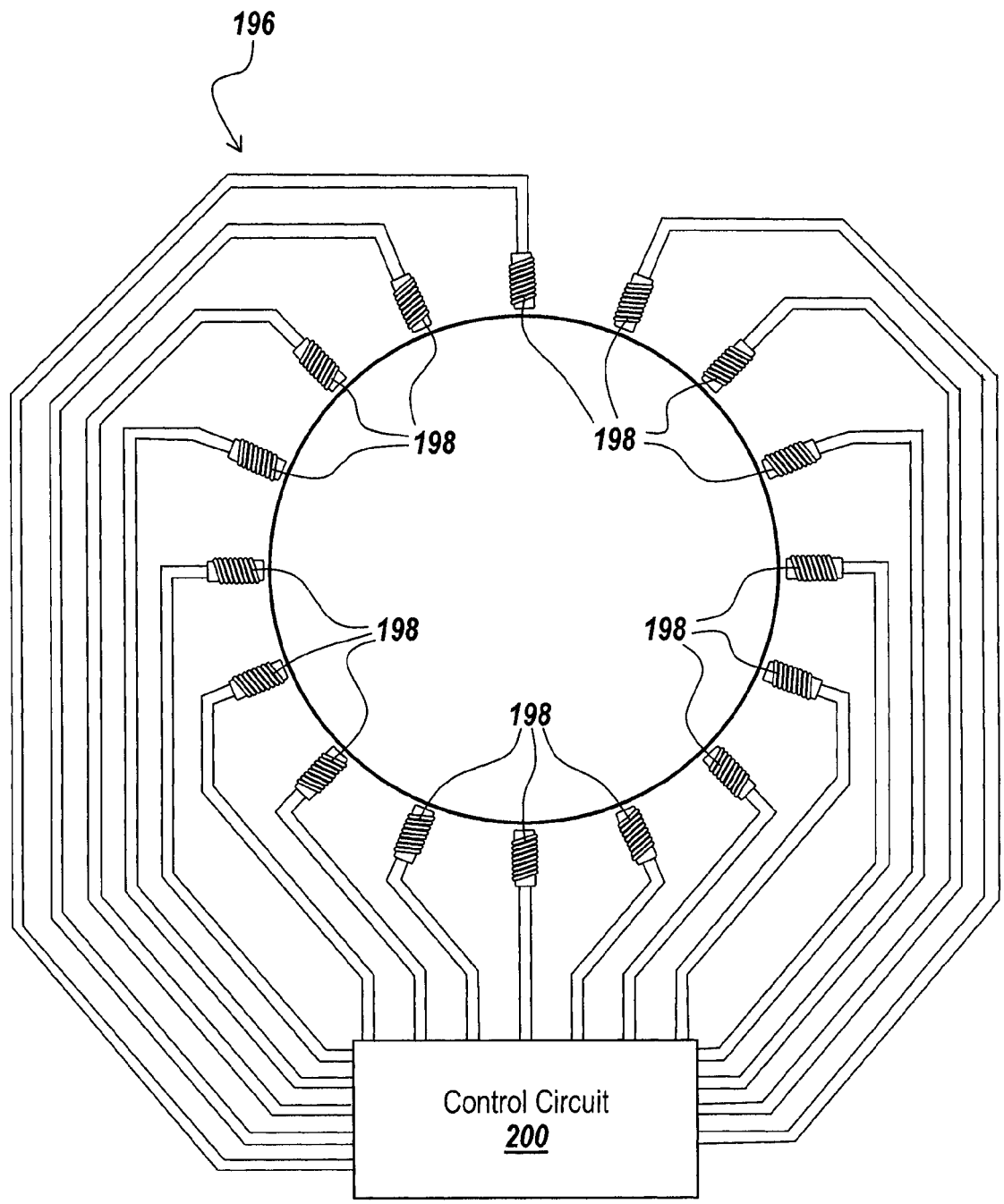
FIG. 12C depicts an axial view of a stator assembly that includes a control circuit that switches conducting circuits between a shorted and a non-shorted state.

FIGS. 12A, 12B and 12C illustrate different embodiments of a stator assembly, according to aspects of the present invention. FIG. 12A depicts an axial view of a part of a stator assembly 184 having non-shorted conducting circuits 186 whose orientation is parallel to a tapered body surface (not shown) interspersed between shorted conducting coils 188 that are co-planar with a central body axis (not shown). FIG. 12B depicts an axial view of part of a different stator assembly 190 having non-shorted conducting circuits 192 whose orientation is parallel to a tapered rotor body surface (not shown) interspersed between shorted conducting circuits 194 that are also parallel to the tapered rotor body surface. FIG. 12C depicts an axial view of a stator assembly 196 having switchable conducting circuits 198 that may be switched between a shorted and a non-shorted state using a control circuit 200. The switchable conducting circuits 198 may be switched individually or switched in groups to provide dynamic control of the ratio of shorted conducting circuits for the passive magnetic bearing and non-shorted conducting circuits for power generation/torque generation.

Figure 13:
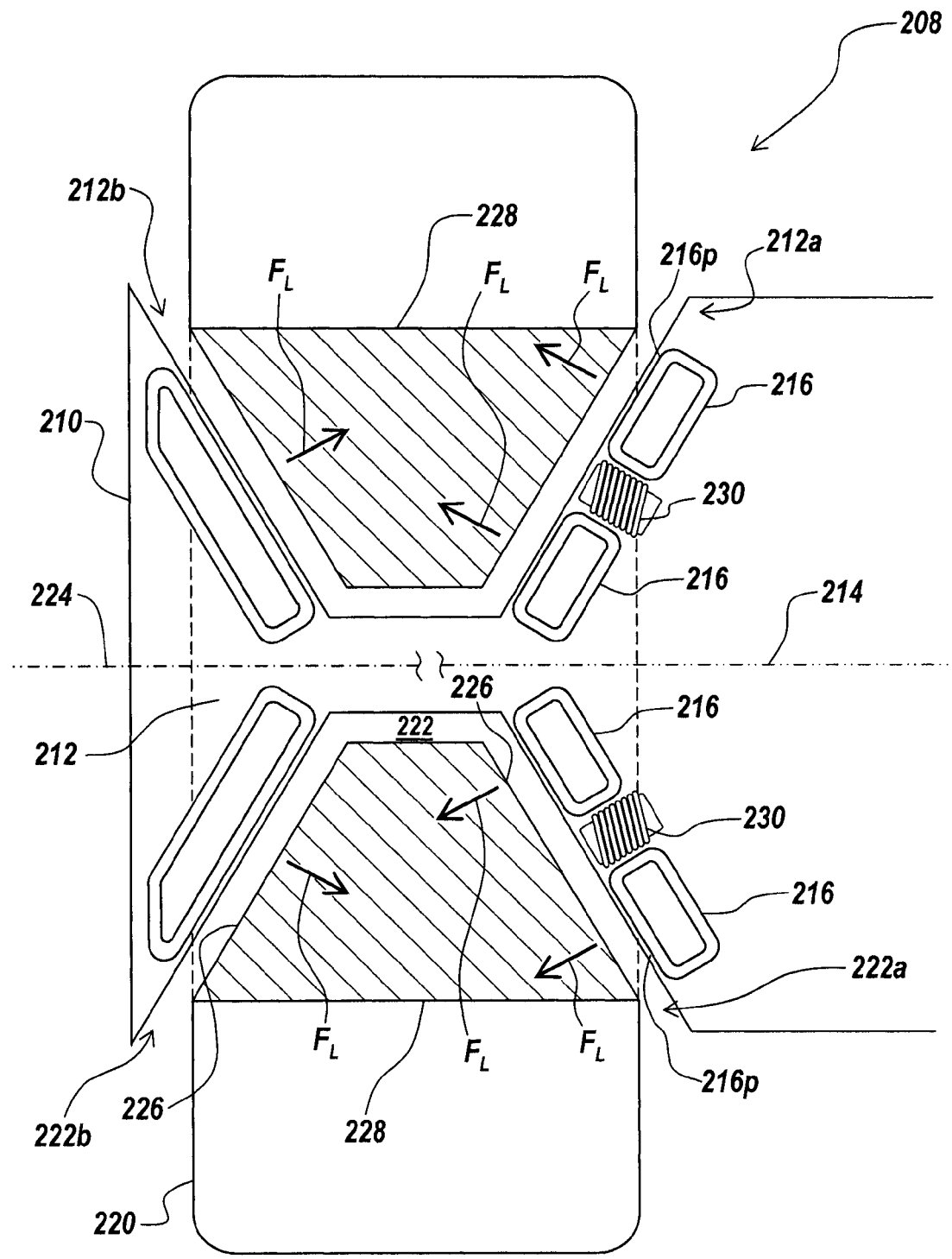
FIG. 13 depicts a side cross-sectional view of different embodiment of a rotational apparatus in which a rotor encircles a stator, according to the teachings of the present invention.

FIG. 13 illustrates a side cross-sectional view of a different embodiment of a rotor assembly 208 that includes a stator 210 having an axle portion 212 with a first axle end 212a, a second axle end 212b and a central stator axis 214 passing through a center of the first axle end 212a and the second axle end 212b. The stator 210 also includes a first flared array of shorted conducting circuits 216 supported by the axle portion 212. An outer profile 216p of the first flared array of shorted conducting circuits 216 flares toward the first axle end 121a.

The rotor assembly 208 also includes a rotor 220 having a central channel 222 with a first channel end 222a, a second channel end 222b and a central rotor axis 224 passing through a center of the first channel end 222a and the second channel end 222b. The rotor 220 has a flared channel surface 226 that flares toward the first channel end 222a. The rotor also includes a magnetic ring 228 that has a plurality of magnetic arrays. A magnetic field produced by the plurality of magnetic arrays measured at the flared channel surface 226 has a substantial component directed tangentially with respect to the central rotor axis 224 and with respect to the flared channel surface 226, and has a substantial component directed along a normal to the flared channel surface 226.

According to the teachings of the present invention, the stator 210 may also include non-shorted conducting circuits 230 for current generation and/or generation of torque on the rotor 220. Rotation of the rotor 220 induces currents in the shorted conducting circuits 216. The currents produce a second magnetic field that interacts with the first magnetic field produced by the magnetic ring 228 resulting in a repulsive force $F_R$ between the shorted conducting circuits 216 and the magnetic ring 228. The repulsive force $F_R$ acts as a passive magnetic bearing for the rotor assembly 208. One of ordinary skill in the art will appreciate that many aspects of embodiments of the invention described above with respect to rotational apparatuses in which the stator assembly encircles the rotor assembly can also be incorporated into embodiments of the invention in which the rotor encircles the stator.

Figure 14:
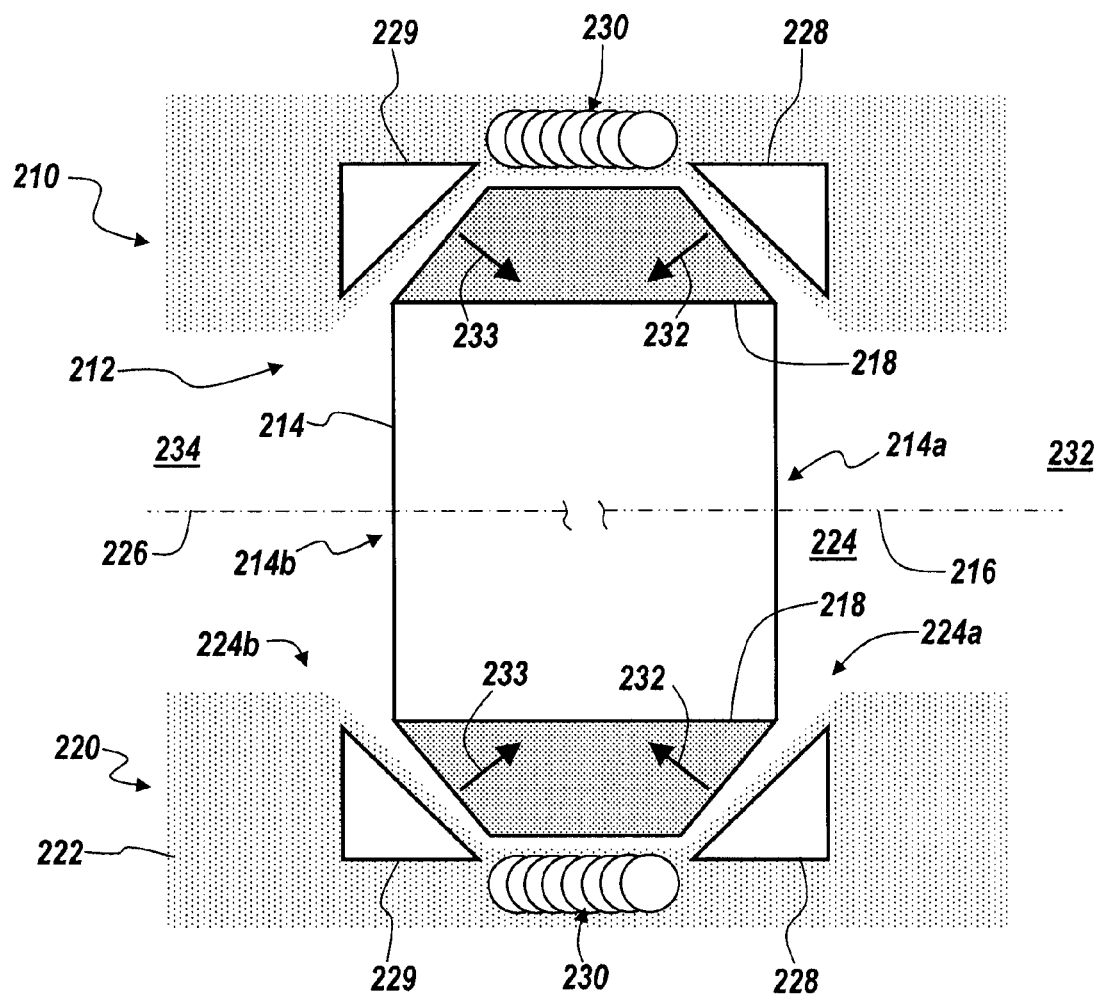
FIG. 14 depicts a cross-sectional view of a different embodiment of a rotor assembly including a tapered bearing array, according to the teachings of the present invention.

Another embodiment of the present invention includes a rotational apparatus 210 having a rotor body 214 with a tapered magnetic ring 218 for both magnetic bearings and the generation of electricity and/or torque generating. FIG. 14 depicts the rotational apparatus 210 that includes a rotor assembly 212 and a stator assembly 220. The rotor assembly 212 has a rotor body 214 with a first rotor end 214a, a second rotor end 214b, and a central rotor axis 216 passing through the center of the first rotor end 214a and the second rotor end 216b. The rotor body 214 also includes a tapered magnetic ring 218 tapering toward a first rotor end 214a, encircling the central rotor axis 216 and disposed at a radial periphery of the rotor body 214.

The stator assembly 220 includes a stator body 222 having a cavity 224 therein. The cavity 224 has a first cavity end 224a, a second cavity end 224b and a central cavity axis 226 passing through a center of the first cavity end 224a and the second cavity end 224b. The stator assembly 220 also includes a tapered stator bearing array 228 which tapers in a direction of the first cavity end 224a disposed at a first cavity end 224a and supported by the stator body 222. The stator assembly 220 includes an array of non-shorted conducting circuits 230 disposed opposite the tapered magnetic ring 218 and supported by the stator body 224.

The tapered magnetic ring 218 and the tapered stator bearing array 228 form a magnetic bearing. The tapered magnetic ring 281 and the tapered stator bearing array 228 exert repulsive forces on each other as indicated by arrows 232. The repulsive forces 232 have both a radial component that acts to center the rotor assembly 212 with respect to the central cavity axis 226, and an axial component that acts to repel the rotor assembly 212 from the tapered stator bearing array 228 in an axial direction.

The tapered magnetic ring 218 and the array of non-shorted conducting circuits 230 transform rotation of the rotor assembly 212 into electric energy and/or transform electric energy into torque exerted on the rotor assembly 212. Rotation of the tapered magnetic ring 218 causes changing magnetic flux through the array of non-shorted conducting circuits 230 which induces currents in the array of non-shorted conducting circuits 230 forming an electric generator. Alternating currents applied to the non-shorted conducting circuits 230 causes torque on the tapered magnetic ring 218 forming an electric motor.

The rotational apparatus may also include a second stator bearing array 229 supported by the stator and disposed at the second cavity end 22b. The tapered magnetic 218 ring may also taper toward a second rotor end 214a. The tapered magnetic ring 218 and the second stator bearing array 229 form a second magnetic bearing which exerts repulsive forces 223 on the rotor assembly 212. With a magnetic bearing at each end, repulsive forces act to radially center the rotor assembly 212 and act to axially center the rotor assembly 212 with respect to the stator cavity 224.

Figure 15A:
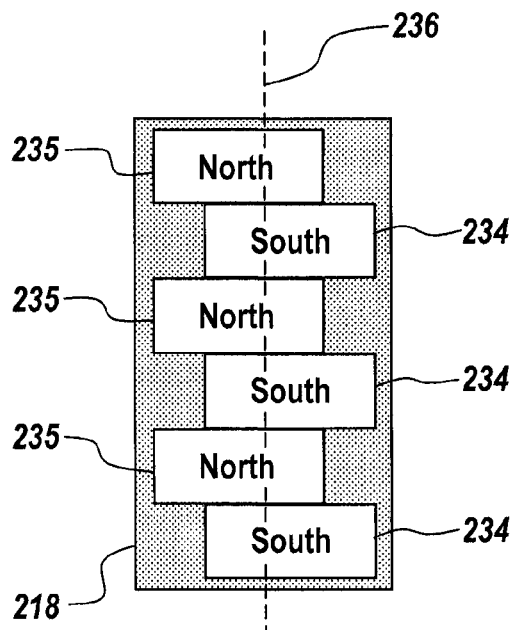
FIG. 15A depicts a radial side view of a portion of a portion of an exemplary tapered magnetic ring.
Figure 15B:
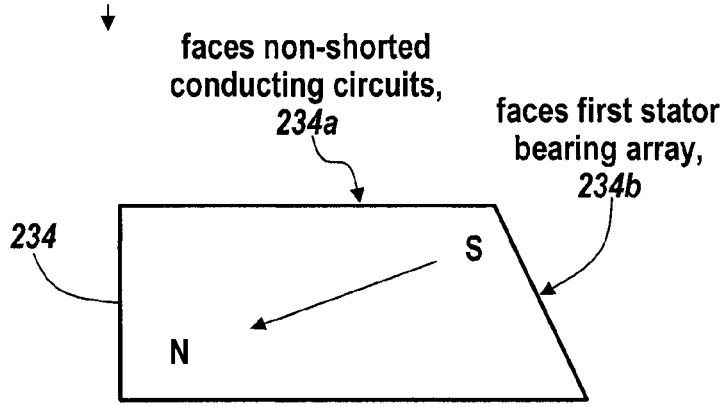
FIG. 15B illustrates a side cross-sectional view of a single magnetic segment in a first set of magnetic segments of the exemplary tapered magnetic ring.
Figure 15C:
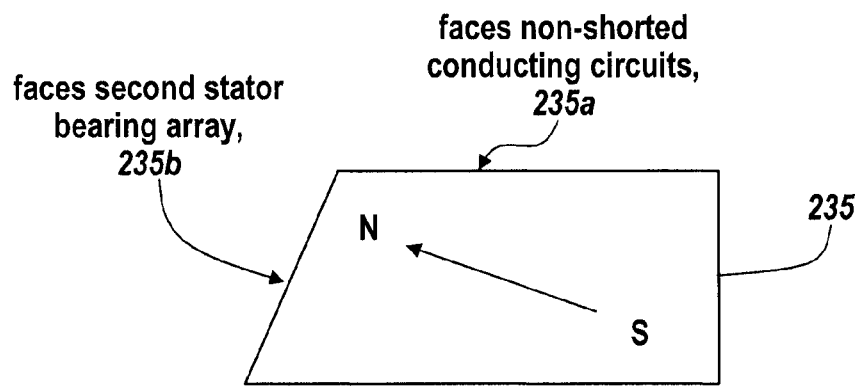
FIG. 15C illustrates a side cross-sectional view of a single magnetic segment in a second set of magnetic segments of the exemplary tapered magnetic ring.

FIGS. 15A, 15B, and 15C depict an exemplary tapered magnetic ring 218 according to the teachings of the present invention. FIG. 15A depicts a radial side view of a portion of the exemplary tapered magnetic ring 218. The exemplary tapered magnetic ring 218 includes a plurality of magnetic segments. The first set of magnetic segments 234 having a "south" orientation are offset toward the first tapered stator bearing array 228 (not shown) and the second set of magnetic segments 235 having a "north" orientation are offset toward the second tapered bearing array 229 (not shown). This produces an overall north magnetic field point toward the first tapered stator bearing array 228 and an overall south magnetic field pointing toward the second tapered stator bearing array 229. As the rotor assembly 212 rotates, the array of non-shorted conducting circuits 230 in the stator body 222 is exposed an alternating magnetic field as illustrated by arrow 236.

FIG. 15B illustrates a side cross-sectional view of a single magnetic segment 234 in the first set of magnetic segments. An outer face 234a of the segment faces the non-shorted conducting circuits 230 (not shown). As illustrated by the arrow within the segment 234, the magnetic orientation of the segment 234 is perpendicular to a side of the segment 234b that faces the first stator bearing array 228 (not shown).

FIG. 15C illustrates a side cross-sectional view of a single magnetic segment 235 in the second set of magnetic segments. An outer face 235a of the segment faces the non-shorted conducting circuits 230 (not shown). As illustrated by the arrow within the segment 235, the magnetic orientation of the segment 235 is perpendicular to a side of the segment 235b that faces the second stator bearing array 229 (not shown).

Figure 16:
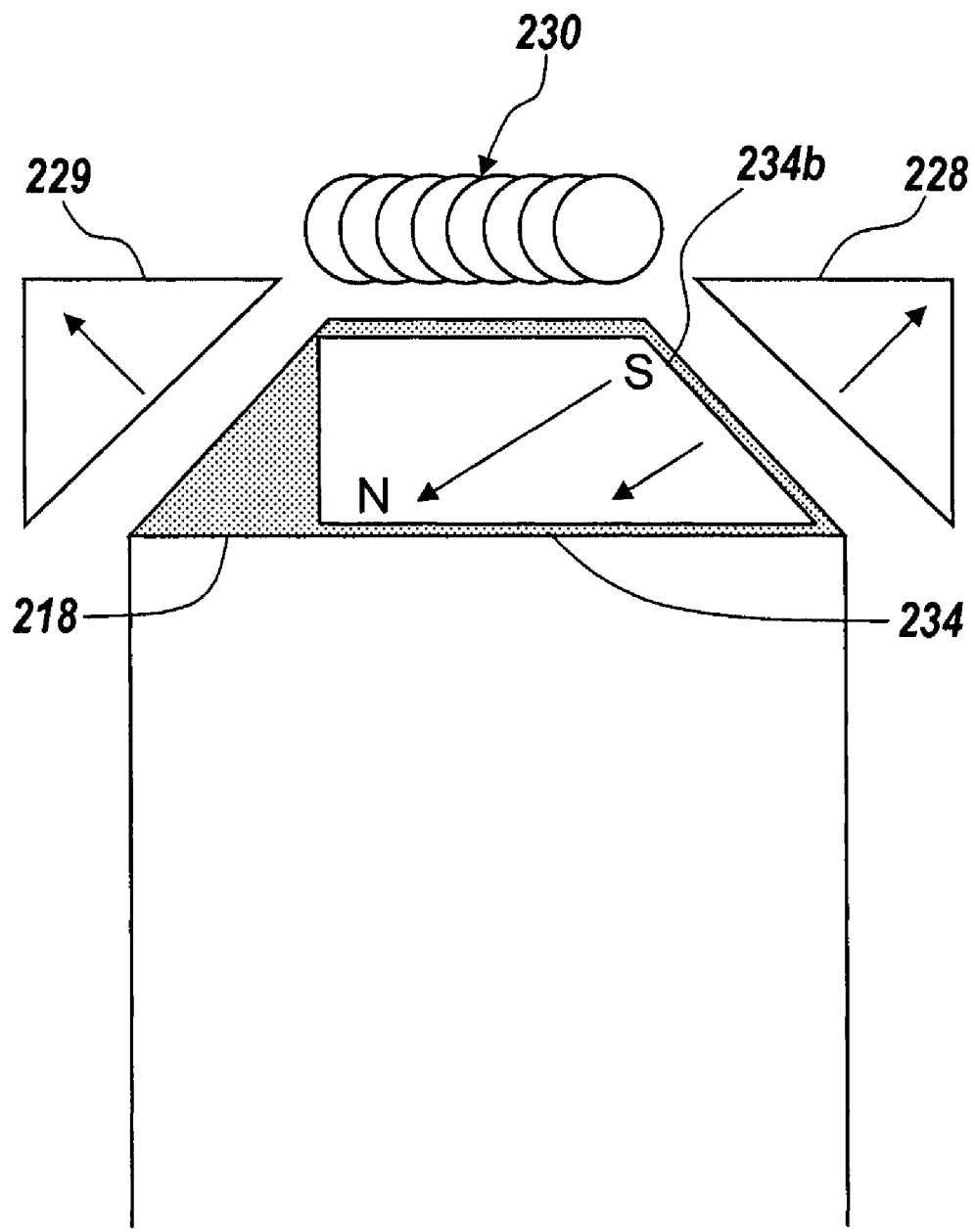
FIG. 16 depicts a side cross-sectional view of a portion of the exemplary tapered magnetic ring, a first tapered bearing array, a second tapered bearing array, and non-shorted conducting coils, according to the teaching of the present invention.

FIG. 16 illustrates a side cross-sectional view of a portion of the exemplary tapered magnetic ring 218, the first tapered bearing array 228, the second tapered bearing array 229, and the non-shorted conducting coils 230 according to the teaching of the present invention. The first tapered bearing array 228 and the segment 234 present opposing magnetic poles to each other, as indicated by the arrows within the segments, which cause repulsive magnetic fields between the first tapered bearing array 228 and the segment 234.

In this embodiment, the magnetic fields of the first tapered bearing array 228 and the second tapered bearing array 229 are not induced magnetic fields, but are generated by tapered bearing arrays 228 229 themselves. The first tapered bearing array 228 may create a magnetic field using permanent magnets, electromagnets or both. The first tapered bearing array 228 and the second tapered bearing array 229, may be continuous magnetic rings, or may be discontinuous magnetic rings.

Figure 17:
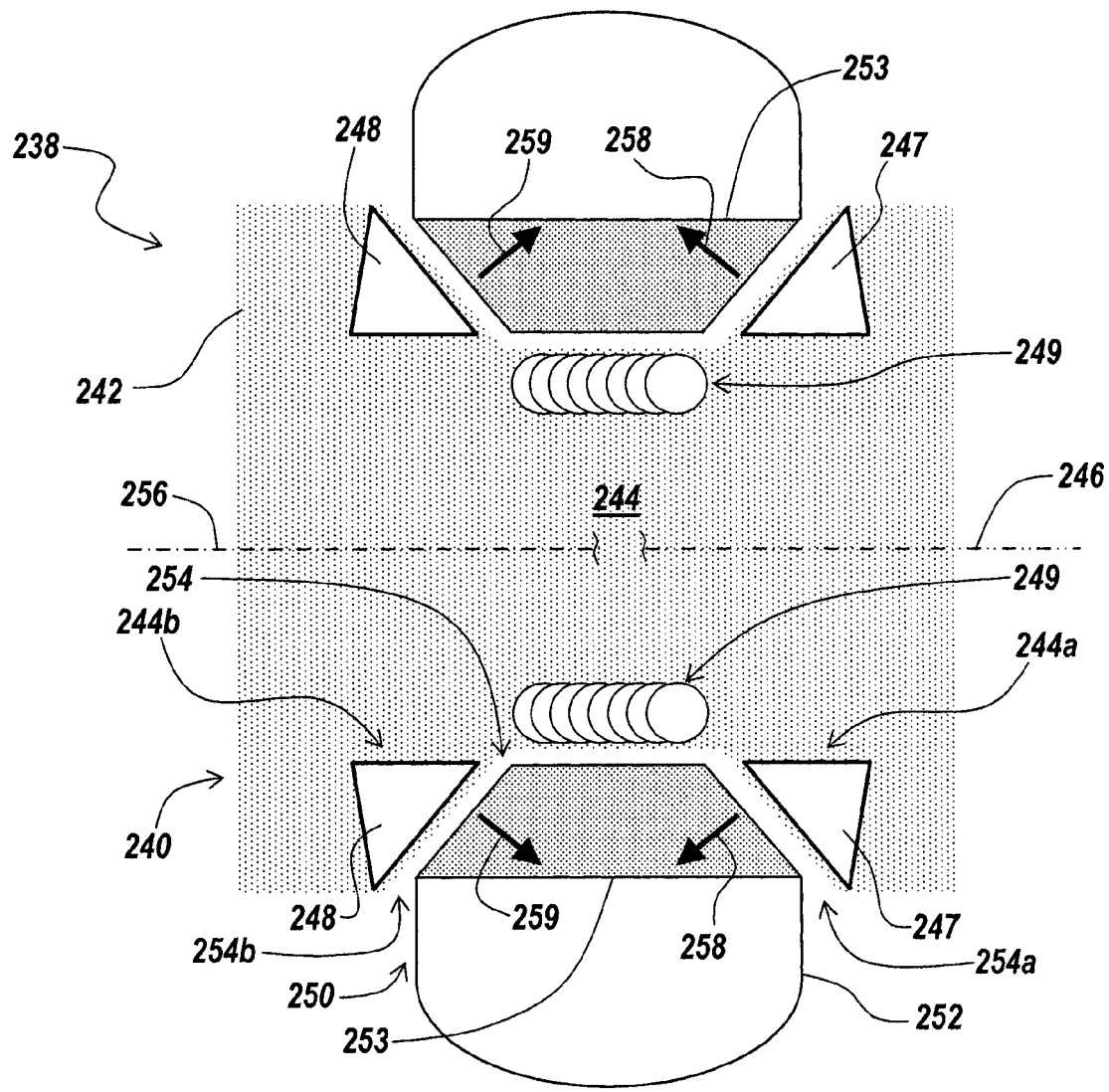
FIG. 17 depicts a side cross-sectional view of an exemplary rotational apparatus with a rotor assembly that encircles a stator assembly, according to the teachings of the present invention.

Another embodiment of the present invention includes a rotational apparatus 238 with a rotor assembly 250 that encircles a stator 240 as depicted in FIG. 17. The rotor assembly 250 includes a rotor body 252 having a central channel 254 with a first channel end 254a and a second channel end 254b and a central channel axis 256 that passes through a center of the first channel end 254a and the second channel end 253b. The rotor body 252 has a flared channel surface that flares toward the first channel end 244a. The rotor body 252 also includes a flared magnetic ring 253 disposed at the first channel end 244a of the rotor body 252 and encircling the central channel 254. The flared magnetic ring 253 has a channel surface 254s that flares in a direction of the first channel end 254a.

The stator 240 includes an axle portion 244 having a first axle end 244a, a second axle end 244b and a central stator axis 246 passing through a center of the first axle end 244a and the second axle end 244b. The stator 240 also includes a flared stator bearing array 247 disposed at the first axle end 244a of the stator 240 and that flares toward the first axle end 244a. The stator 240 also includes an array of non-shorted conducting circuits 249 supported by the stator 240 and disposed opposite the flared magnetic ring 253. The flared magnetic ring 253 and the flared stator bearing array 247 form a magnetic bearing that exerts a repulsive magnetic force, indicated by arrows 258, with a radial component on the flared magnetic ring 253 to center the rotor assembly 250 with respect to the central cavity axis 256. The repulsive magnetic force 258 also includes an axial component to prevent the rotor assembly 250 from contacting the flared stator bearing array 247.

The non-shorted conducting circuits 249 interact with the flared magnetic ring 253 to convert between rotational energy and electrical energy.

According to the teachings of the present invention, the stator 240 may include a second stator bearing array 248, and the channel surface 244s of the flared magnetic ring 253 may also flare toward the second channel end 244a. The second stator bearing array 248 and the flared magnetic ring 253 may form a second magnetic bearing with the repulsive force 259.

Figure 18:
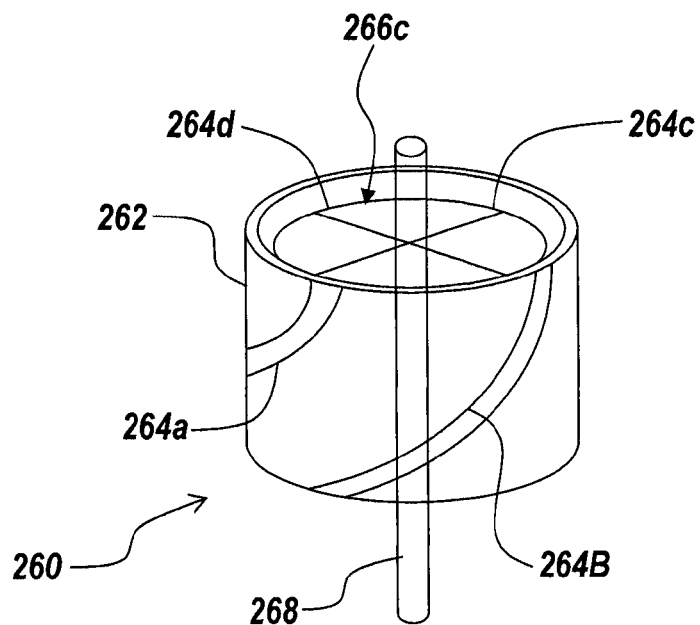
FIG. 18 depicts a perspective view of an exemplary rotational apparatus with an external rotor assembly, according to the teachings of the present invention.
Figure 19:
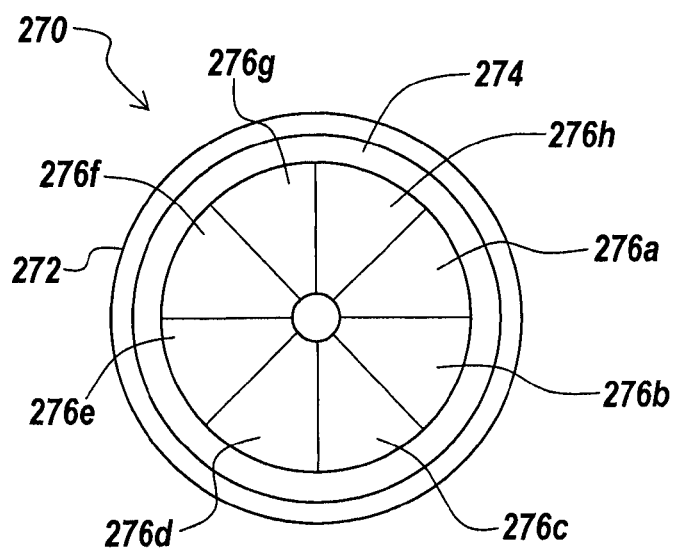
FIG. 19 depicts an axial view of an exemplary rotational apparatus with a rotor in the form of an impellor, according to the teachings of the present invention.

FIG. 18 illustrates a perspective view of an exemplary rotational apparatus 260 that includes a rotor assembly 262 with turbine blades 264a, 264b, 264c, 264d encircling a stator assembly 266 that is attached to a central shaft 268, according to the teachings of the present invention. FIG. 19 illustrates an axial view of a different exemplary rotational apparatus 270 including a stator assembly 272 encircling a rotor assembly 274 having impellor blades 276a-297h.

Figure 20:
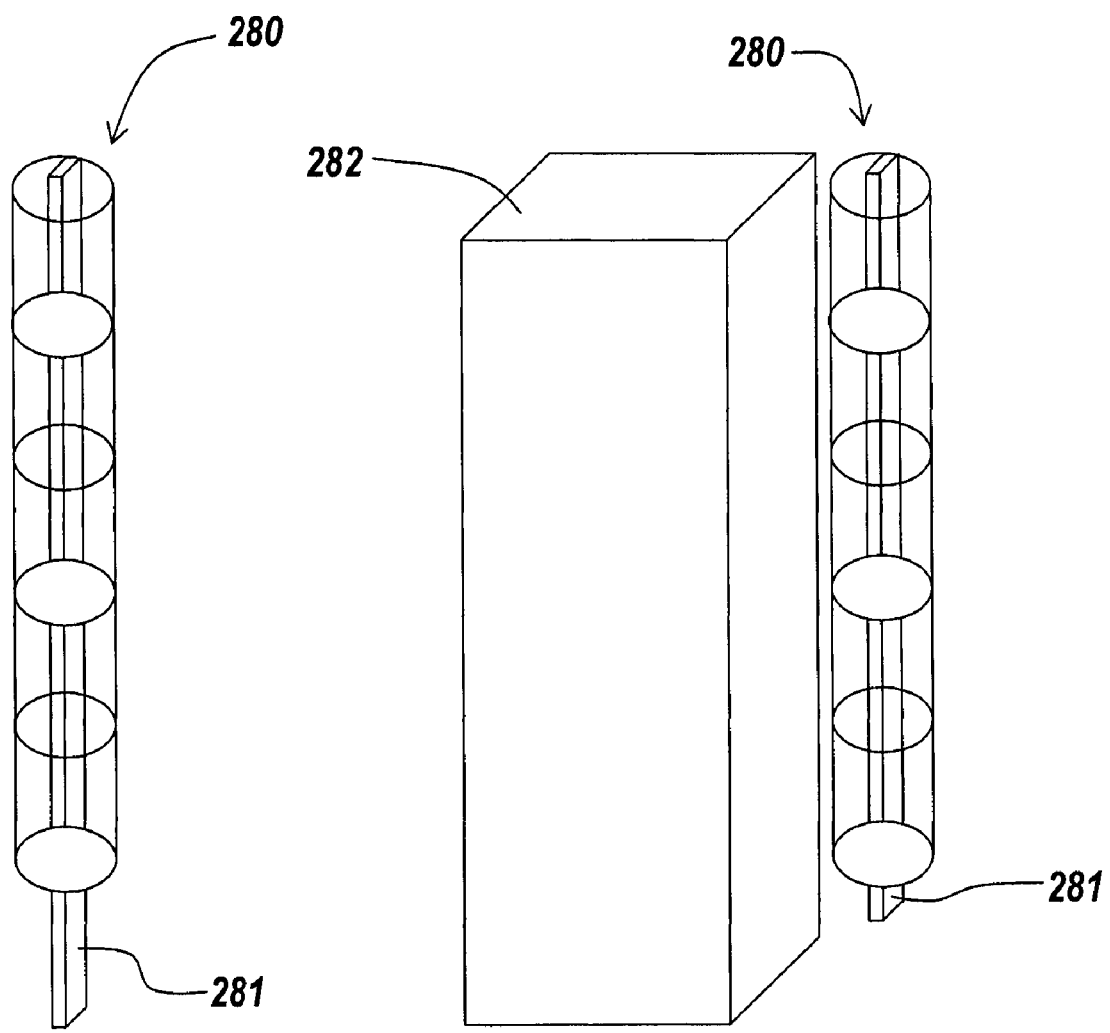
FIG. 20 depicts a perspective view of a generator column of rotational apparatuses, according to the teachings of the present invention.
Figure 21A:
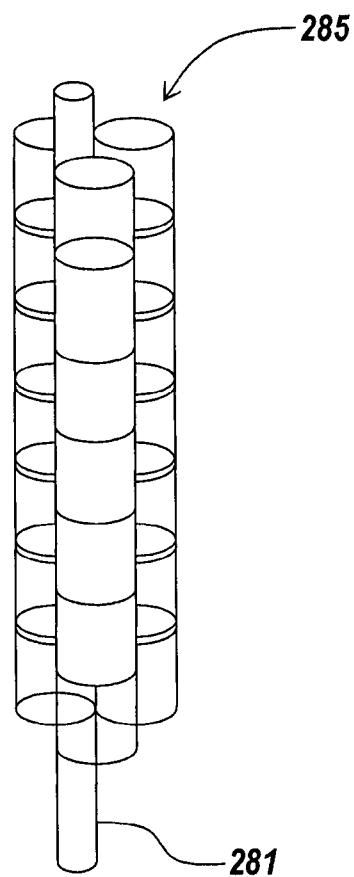
FIG. 21A depicts a perspective view of an array of generator columns of rotational apparatuses, according to the teachings of the present invention.
Figure 21B:
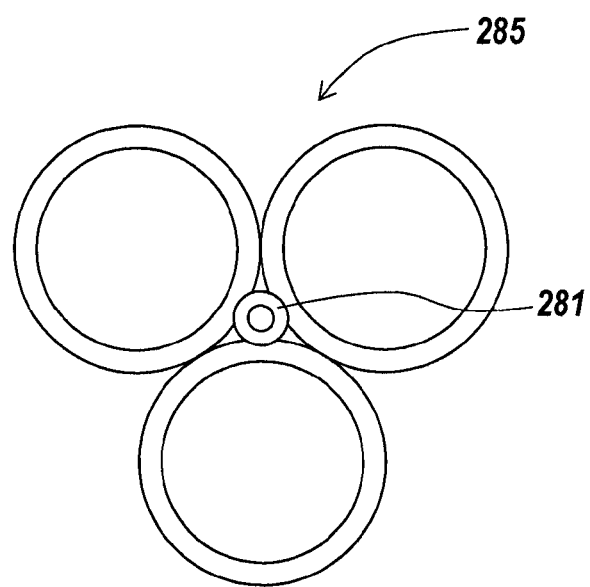
FIG. 21B depicts an axial view of the of an array of generator columns, according to the teachings of the present invention.

According to the teachings of the present invention, many exemplary rotational apparatuses may be joined along an axis oriented vertically to form a generator column 280 as depicted in FIG. 20. The generator column is shown being supported by a large vertical structure such as a pole 281, and/or a side of a building 282 or a bridge abutment. An array of generator columns 285 may be attached to a pole 286 and used to generate electricity as illustrated in FIG. 21A. FIG. 21B depicts an axial view of the array of generator columns 285.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

What is claimed is:

1. A rotational apparatus with a passive magnetic bearing, the rotational apparatus comprising:
    a stator assembly comprising:
        a stator body having a cavity with a first cavity end and a central cavity axis passing through a center of the first cavity end; and
        a tapered array of shorted conducting circuits supported by the stator body, the tapered array of shorted conducting circuits having an inner profile that defines a tapered shape extending toward the first cavity end; and
    a rotor assembly comprising
        a rotor body having a first body end and a central body axis passing through the center of first body end, the rotor body including a first tapered portion extending along the central body axis and tapering toward the first body end, wherein a shape of the tapered portion of the rotor body is complementary to the tapered shape of the inner profile of the tapered array of shorted conducting circuits; and
        a tapered magnetic ring disposed at the first tapered portion of the rotor body, the tapered magnetic ring having a plurality of magnetic arrays;
    wherein the plurality of magnetic arrays comprises a plurality of magnetic Halbach arrays;
    wherein each of the plurality of magnetic Halbach arrays comprises five magnetic segments;

wherein a first end magnetic segment and a last end segment are smaller than middle segments of each array of five segments, and wherein the rotor assembly is disposed in the cavity of the stator assembly.

2. The rotational apparatus of claim 1, wherein the plurality of magnetic arrays produces a magnetic field with a substantial component directed at a normal to a surface of the first tapered portion of the rotor body.

3. The rotational apparatus of claim 1, wherein a magnetic field produced by the plurality of magnetic arrays measured at a surface of the first tapered portion of the rotor body has a substantial component directed tangentially with respect to the central body axis and with respect to the surface.

4. The rotational apparatus of claim 1, wherein rotation of the tapered magnetic ring about the central body axis induces current in the tapered array of shorted circuits causing a magnetic force on the tapered magnetic ring directed away from the tapered array of shorted conducting circuits; and wherein the magnetic force on the tapered magnetic ring has both an inward radial component with respect to the central cavity axis and an axial component relative to the central cavity axis.

5. The rotational apparatus of claim 4, wherein the magnetic force acts to center the rotor assembly with respect to the central cavity axis.

6. The rotational apparatus of claim 1, wherein each of the plurality of magnetic Halbach arrays is oriented and positioned to minimize a magnitude of a magnetic field directed into the rotor body.

7. The rotational apparatus of claim 1, wherein the tapered magnetic ring of the rotor assembly is opposed to the magnetic array of shorted conducing circuits of the stator assembly when the rotor assembly is rotating.

8. The rotational apparatus of claim 1, wherein the plurality of magnetic arrays of the tapered magnetic ring form a single continuous repeating magnetic array.

9. The rotational apparatus of claim 1, wherein the plurality of arrays of the tapered magnetic ring do not form a non-continuous repeating magnetic array.

10. The rotational apparatus of claim 1, wherein a shorted conducting circuit in the tapered array of shorted conducting circuits comprises:

an inner conducting segment forming a portion of the inner profile of the tapered array;

an outer conducting segment parallel to the inner conducting segment;

a top conducting segment perpendicular to the inner conducting segment; and a bottom conducting segment perpendicular to the inner conducting segment.

11. The rotational apparatus of claim 1, wherein the tapered array of shorted conducting circuits is a tapered array of stamped shorted coils.

12. The rotational apparatus of claim 1, wherein a plurality of shorted conducting circuits in the tapered array of conducting circuits are substantially parallel to a first tapered body surface when the rotor assembly is positioned for rotation.

13. The rotational apparatus of claim 1, wherein the plurality of shorted conducting circuits comprises a tapered conducting ring having a plurality of slots formed there through.

14. The rotational apparatus of claim 1, wherein the plurality of shorted conducting circuits comprises a plurality of tapered conducting rings, each tapered conducting ring having a plurality of slots formed there through.

15. The rotational apparatus of claim 1, wherein the first tapered body surface has a 25 conical shape.

16. The rotational apparatus of claim 1, wherein the first tapered body surface has a spherical shape.

17. The rotational apparatus of claim 1, wherein a profile of the first tapered portion of the rotor body is arcuate.

18. The rotational apparatus of claim 1, wherein the stator assembly further comprises an array of non-shorted conducting circuits.

19. The rotational apparatus of claim 18, wherein the non-shorted conducting circuits are positioned and oriented to exert magnetic torque on the rotor assembly when the non-shorted conducting circuits are supplied with alternating current.

20. The rotational apparatus of claim 18, wherein the non-shorted conducting circuits are positioned and oriented for current to be induced in the non-shorted conducting circuits when the rotor assembly is rotating.

21. The rotational apparatus of claim 18, wherein the rotational apparatus is an electric motor, an electric generator or both.

22. The rotational apparatus of claim 1, wherein the rotor body further comprises an impeller.

23. The rotational apparatus of claim 1, wherein the rotor body further comprises a plurality of rotor blades.

24. The rotational apparatus of claim 1, wherein the stator assembly further comprises a fluid inlet connected with the first end of the cavity and a fluid outlet connected with the second end of the cavity.

25. The rotational apparatus of claim 1, wherein the rotor body further comprises a helical turbine blade.

26. The rotational apparatus bearing of claim 1, wherein the rotor body has a second body end opposite the first body end and the rotor body includes a second tapered portion extending along the central body axis and tapering toward the second body end;

wherein the tapered magnetic ring tapers toward the first body and tapers toward the second body end;

wherein the stator body has a second cavity end opposite the first cavity end;

wherein the stator assembly further comprises a second tapered array of shorted conducting circuits supported by the stator body; and wherein the second tapered array of shorted conducting circuits has an inner profile defining a second tapered shape that is complementary to a second tapered portion of the rotor body.

* * * * *